US007246739B2

(12) United States Patent
Hashimoto et al.

(10) Patent No.: US 7,246,739 B2
(45) Date of Patent: Jul. 24, 2007

(54) SYSTEM OF SETTLEMENT TRANSACTION AND METHOD

(75) Inventors: Kazunori Hashimoto, Fujisawa (JP); Yutaka Takami, Yokohama (JP); Makoto Aikawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 469 days.

(21) Appl. No.: 10/833,339

(22) Filed: Apr. 28, 2004

(65) Prior Publication Data

US 2005/0098628 A1 May 12, 2005

(30) Foreign Application Priority Data

Nov. 11, 2003 (JP) .............................. 2003-380629

(51) Int. Cl.
G06F 7/00 (2006.01)
G07F 19/00 (2006.01)
G06K 5/00 (2006.01)

(52) U.S. Cl. ........................ 235/375; 235/379; 235/380
(58) Field of Classification Search ................ 235/375, 235/379, 380, 492
See application file for complete search history.

(56) References Cited

U.S. PATENT DOCUMENTS

2002/0066042 A1* 5/2002 Matsumoto et al. ........ 713/202

FOREIGN PATENT DOCUMENTS

| JP | 2002-024578 A | 1/2002 |
|---|---|---|
| JP | 2003-016361 | 1/2003 |
| KR | 2002-0036481 | 5/2002 |
| KR | 2002/0068844 | 8/2003 |
| TW | 504629 | 11/2000 |
| TW | 542379 | 1/2002 |

OTHER PUBLICATIONS

Translation of Taiwanese Office Action.
Translation of Korean Office Action.
EMVCo Type Approval Terminal Level 1 Requirement, Version 1.0, Apr. 30, 2000.
EMVCo Type Approval Terminal Level 2 Requirement, Version 1.0, Aug. 31, 2000.
EMV '96 Integrated Circuit Card Specification for Payment Systems, Version 3.1.1, May 31, 1998.
EMV 2000 Integrated Circuit Card Specification for Payment Systems, Version 4.0, Dec. 2000.

* cited by examiner

Primary Examiner—Thien M. Le
Assistant Examiner—April Taylor
(74) Attorney, Agent, or Firm—McDermott Will & Emery LLP

(57) ABSTRACT

In a settlement transaction system or settlement transaction method using the system, the system includes a content providing server conducting a digital broadcast, for example, for a CS broadcast, a BS broadcast, a CATV, or a broadcast using ground waves; a settlement server to execute settlement transaction or settlement transaction, an order placement managing server to execute order placement processing, and an order managing server which receives an order of a request from a user to purchase articles and which sends an associated indication to the settlement server and the order placement managing server according to information of the order. The user operates a terminal in which an IC card communication application to communicate with an IC card is only installed. It then becomes possible to reduce a load imposed onto the system in association with a change to an existing digital broadcast system.

12 Claims, 25 Drawing Sheets

FIG. 7

CUSTOMER DATABASE

| CUSTOMER ID 800 | NAME 801 | ADDRESS 802 | AVAILABLE SETTLEMENT SCHEME 803 |
|---|---|---|---|
| 00001 | ×××TARO | ADDRESS a | A.B.C |
| 00002 | □□ JIRO | ADDRESS b | A.B.C.D |
| 00003 | ▽▽ HANAKO | ADDRESS c | A.B |
| ... | ... | ... | ... |

A : ACCOUNTING  B : CREDIT  C : DEBIT

FIG. 8

ORDER PLACEMENT DATABASE

| CUSTOMER ID 800 | TRANSACTION NO. 900 | ITEM NO. 901 | UNIT PRICE 902 | QUANTITY 903 | SETTLEMENT AMOUNT 904 | SETTLEMENT TYPE 905 | MONTHLY AMOUNT 906 |
|---|---|---|---|---|---|---|---|
| 001 | 01234577 | H-189 | ¥8,600 | 1 | ¥8,600 | C | ¥8,600 |
| | 12345678 | G-001 | ¥9,800 | 1 | ¥9,800 | B | ¥18,400 |
| | ... | ... | ... | ... | ... | ... | ... |
| | 21300456 | X-751 | ¥9,800 | 2 | ¥19,600 | B | ¥58,600 |
| ... | ... | ... | ... | ... | ... | ... | ... |
| 002 | 00031256 | I-321 | ¥1,200 | 1 | ¥1,200 | A | ¥1,200 |
| | ... | ... | ... | ... | ... | ... | ... |
| | 1548606 | B-083 | ¥2,600 | 2 | ¥2,600 | B | ¥6,400 |

A : ACCOUNTING  B : CREDIT  C : DEBIT

FIG. 9A

| ARTICLE SELECTION 1001 | TERMINAL ID 1002 | ITEM NO. 1000 | UNIT PRICE 902 | QUANTITY 903 | SETTLEMENT AMOUNT 904 | SETTLEMENT TYPE 905 |
|---|---|---|---|---|---|---|
| 1004 | | | | | | |

ARTICLE SELECTION TEXT 1003

FIG. 9B

| SETTLEMENT CONFIRMATION 1006 | TERMINAL ID 1002 | ITEM NO. 901 | UNIT PRICE 902 | QUANTITY 903 | SETTLEMENT AMOUNT 904 | SETTLEMENT TYPE 905 |
|---|---|---|---|---|---|---|

SETTLEMENT CONFIRMATION TEXT 1005

FIG. 9C

| CONFIRMED INFORMATION 1008 | TERMINAL ID 1002 | ITEM NO. 901 | UNIT PRICE 902 | QUANTITY 903 | SETTLEMENT AMOUNT 904 | SETTLEMENT TYPE 905 |
|---|---|---|---|---|---|---|

CONFIRMED INFORMATION TEXT 1007

FIG. 9D

| SETTLEMENT START 1010 | TERMINAL ID 1002 | ITEM NO. 901 | UNIT PRICE 902 | QUANTITY 903 | SETTLEMENT AMOUNT 904 | SETTLEMENT TYPE 905 |
|---|---|---|---|---|---|---|

SETTLEMENT START TEXT 1009

FIG. 9E

| SETTLEMENT COMPLETION 1012 | TERMINAL ID 1002 |
|---|---|

SETTLEMENT COMPLETION TEXT 1011

FIG. 9F

| COMPLETION CONFIRMATION 1014 | TERMINAL ID 1002 | TRANSACTION NO. 800 | ITEM NO. 901 | UNIT PRICE 902 | QUANTITY 903 | SETTLEMENT AMOUNT 904 | SETTLEMENT TYPE 905 |
|---|---|---|---|---|---|---|---|

COMPLETION CONFIRMATION TEXT 1013

FIG. 9G

| ORDER PLACEMENT 1016 | CUSTOMER ID | TRANSACTION NO. 800 | ITEM NO. 901 | UNIT PRICE 902 | QUANTITY 903 | SETTLEMENT AMOUNT 904 | SETTLEMENT TYPE 905 |
|---|---|---|---|---|---|---|---|

ORDER PLACEMENT TEXT 1015

FIG. 9H

| ORDER PLACEMENT COMPLETION | CUSTOMER ID |
|---|---|

ORDER PLACEMENT COMPLETION TEXT 1015

IC CARD COMMUNICATION TEXT 1100

IC CARD COMMUNICATION REPLY TEXT 1103

IC CARD COMMUNICATION PROGRAM INITIATION TEXT 1105

INITIATION COMPLETION TEXT 1107

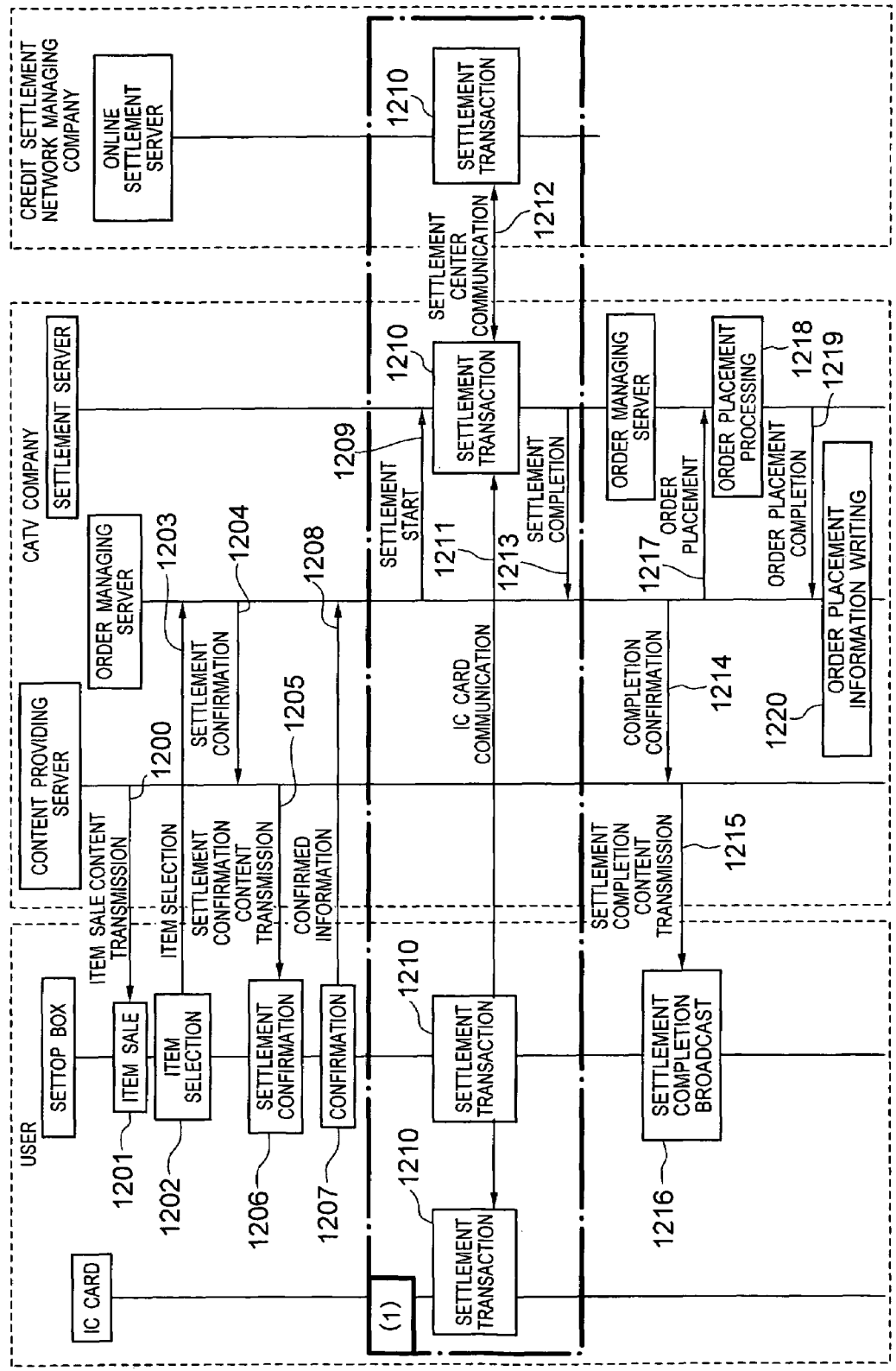

FIG. 23A

| ITEM CANCELLATION 2001 | TERMINAL ID 1002 | CUSTOMER ID 800 |
|---|---|---|

ITEM CANCELLATION TEXT 2000

FIG. 23B

| ITEM CANCELLATION 2001 | TERMINAL ID 1002 | CUSTOMER ID 800 | TRANSACTION NO. 900 | SETTLEMENT INFORMATION 2002 |
|---|---|---|---|---|

ITEM INFORMATION TEXT 2003

FIG. 23C

| CANCELLATION SELECTION 2006 | TERMINAL ID 1002 | CUSTOMER ID 800 | TRANSACTION NO. 900 | SETTLEMENT AMOUNT 904 |
|---|---|---|---|---|

CANCELLATION SELECTION TEXT 2005

FIG. 23D

| CANCELLATION CONFIRMATION 2008 | TERMINAL ID 1002 | CUSTOMER ID 800 | TRANSACTION NO. 900 | SETTLEMENT AMOUNT 904 |
|---|---|---|---|---|

CANCELLATION CONFIRMATION TEXT 2007

FIG. 23E

| CANCELLATION INFORMATION 2010 | TERMINAL ID 1002 | CUSTOMER ID 800 | TRANSACTION NO. 900 | SETTLEMENT AMOUNT 904 |
|---|---|---|---|---|

CANCELLATION INFORMATION TEXT 2009

FIG. 23F

| CANCELLATION START 2012 | TERMINAL ID 1002 | CUSTOMER ID 800 | TRANSACTION NO. 900 | SETTLEMENT AMOUNT 904 |
|---|---|---|---|---|

CANCELLATION START TEXT 2011

FIG. 23G

| CANCELLATION COMPLETION 2014 | TERMINAL ID 1002 |
|---|---|

CANCELLATION COMPLETION TEXT 2013

FIG. 23H

| CANCELLATION COMPLETION CONFIRMATION 2016 | TERMINAL ID 1002 | CUSTOMER ID 800 | TRANSACTION NO. 900 | SETTLEMENT AMOUNT 904 |
|---|---|---|---|---|

CANCELLATION COMPLETION CONFIRMATION TEXT 2015

ORDER PLACEMENT CANCELLATION TEXT 2017

ORDER PLACEMENT CANCELLATION COMPLETION TEXT

ORDER PLACEMENT CANCELLATION TEXT 2021

FIG. 26

| SELECT ITEMS TO BE REMOVED FROM PURCHASE HISTORY ||||||
|---|---|---|---|---|---|
| SELECT | TRANSACTION NO. | ITEM | QUANTITY | AMOUNT | SETTLEMENT SCHEME |
| ☐ | 01234577 | VACUUM CLEANER | ONE | ¥8,600 | DEBIT |
| ✓ | 12345678 | TROUSERS | ONE | ¥9,800 | CREDIT |
| ☐ | 21300456 | SUNGLASSES | TWO | ¥19,600 | CREDIT |
| ☐ | | | | | |

◁ ▷
BACKWARD FORWARD        O.K.   CANCEL

FIG. 27

CONFIRM ITEMS TO BE CANCELLED.

ITEMS TO BE CANCELLED

TRANSACTION NO.
12345678

ITEM NO.     G-001
ITEM NAME   TROUSERS
SIZE         M
PRICE        ¥9,800
QUANTITY    ONE
TOTAL        ¥9,800

CONFIRM   CANCEL of settlement transaction and method, and in particular, to a settlement transaction system and a settlement transaction method, for example, using an integrated-circuit (IC) card via a network.

SYSTEM OF SETTLEMENT TRANSACTION AND METHOD

The present application claims priority from Japanese application JP 2003-380629 filed on Nov. 11, 2003, the content of which is hereby incorporated by reference into this application.

BACKGROUND OF THE INVENTION

The present invention relates to a settlement transaction system and a settlement transaction method, and in particular, to a settlement transaction system and a settlement transaction method, for example, using an integrated-circuit (IC) card via a network.

Heretofore, digital broadcast signals used in various facilities such as a communications satellite (CS), a broadcast satellite (BS), a cable television (CATV), and a broadcasting system using ground waves are received by a receiver, for example, a dedicated tuner such as a settop box (STB) and a television terminal integrally included in such a tuner. The settop box and the television terminal or set can bidirectionally communicate data with an external server using a communication line. Therefore, it is possible to implement a method of and a system for providing services using the bidirectional communication such as a system of, for example, online television (TV) shopping. For example, JP-A-2002-24578 describes a method and a system using the bidirectional communication for the online TV shopping to provide services of ordering and delivering articles or items periodically purchased by customers.

For example, JP-A-2003-16361 describes a settlement transaction method and a settlement transaction system which are associated with online shopping and which are capable of coping with various settlement schemes or methods using, for example, a credit card and a debit card to easily and safely conduct online settlement from various terminals via a network. As specifications of processing procedure for the transaction procedure, there has been, for example, EMV (Europay, Mastercard and Visa) specifications. The specifications include "Type Approval" as a terminal approval scheme. The Type Approval has two levels, i.e., Level 1 and Level 2. The functions required therein have been defined by "EMV 2000 Integrated Circuit Card Specification for Payment Systems" and "EMV 1996 Integrated Circuit Card Specification for Payment Systems".

According to the prior art of JP-A-2002-24578, in the method of and a system for providing services of ordering and delivering articles periodically purchased by customers using the bidirectional communication for the online TV shopping, one server executes processing of order placement, processing of order acceptance, processing of settlement or settlement transaction, processing of personal authentication of the customer, and processing of item information production to produce, for example, an image of an article for sale. Therefore, in a case in which an existing settlement scheme or way of the server copes with only a credit card, if there occurs an event in which a debit card is also specified as a settlement scheme, the server needs to obtain a settlement application coping with settlement using a debit card. However, since the server includes applications not related to settlement, it is difficult, in consideration of the human power of maintenance and the cost for installation of the new application, to additionally install a settlement application for settlement using a debit card.

The settlement transaction method and the settlement transaction system of JP-A-2003-16361 are suitable for electronic commerce (EC) using a network. However, a terminal of the user in this system needs to include settlement applications only for predetermined settlement methods. Therefore, to increase a settlement method, it is necessary to obtain a settlement application coping with the new settlement method.

SUMMARY OF THE INVENTION

It is therefore an object of the present invention to provide a settlement transaction system using a digital broadcast and a settlement transaction method using an IC card via a network. The system includes a content providing server conducting a digital broadcast, for example, for a communications satellite (CS) broadcast, a broadcast satellite (BS) broadcast, a cable television (CATV), or a broadcast using ground waves; a settlement server to execute settlement transaction or settlement transaction, an order placement managing server to execute order placement processing, and an order managing server which receives an order of a request from a user or a customer to purchase articles or items and which sends an associated indication to the settlement server and the order placement managing server according to information of the order. In the system, the user operates his or her terminal in which a settlement application to execute settlement transaction or processing is not installed, but only an IC card communication application to communicate with an IC card is installed. This advantageously reduces a load imposed onto the system in association with a change to an existing digital broadcast system.

According to the present invention, there is provided a settlement transaction system having high usability.

BRIEF DESCRIPTION OF THE DRAWINGS

These and other objects, features and advantages of the present invention will become more readily apparent from the following detailed description when taken in conjunction with the accompanying drawings wherein:

FIG. 7 is a table showing an example of a customer database (DB) including customer information of customers or users each having made a contract as a subscriber of cable television with a CATV firm;

FIG. 8 is a table showing an example of an order placement database including order placement information such as an ordered article for which a user has ordered and of which an order has been completely placed;

FIGS. 9A to 9H are diagrams showing specific examples of layouts of texts communicated between the order managing server 101 and the settop box 200, between the order managing server 101 and a content providing server 100, and between the order managing server 101 and the settlement server 102;

FIG. 11 is a flowchart showing a processing flow ranging from when a user selects a desired article using the settop box 200 from a TV shopping program of a digital broadcast to when the order managing server 100 completely executes settlement transaction;

FIG. 12 is a flowchart showing a flow of settlement transaction 1210 executed using an IC card 201, the settop box 200, the settlement server 102, and an online settlement server 300a;

FIG. 16 is a flowchart showing a flow of settlement transaction or processing 1210 executed using a remote control 202 or a portable terminal 203, the IC card 201, the settop box 200, the settlement server 102, and an online settlement server 300a;

FIGS. 23A to 23H are diagrams showing specific examples of layouts of texts communicated between the order managing server 101 and the settop box 200, between the order managing server 101 and the content providing server 100, and between the order managing server 101 and the settlement server 102;

FIG. 26 is a diagram showing a specific example of a purchase information screen image for the user to select the article for the cancellation of the purchase thereof;

FIG. 27 is a diagram showing a specific example of a cancellation confirmation screen image for the user to confirm detailed information of the purchase cancellation;

DESCRIPTION OF THE EMBODIMENTS

Description will now be given in detail of embodiments according to the present invention.

Description will be given in detail of a first embodiment according to the present invention.

Figure 1:
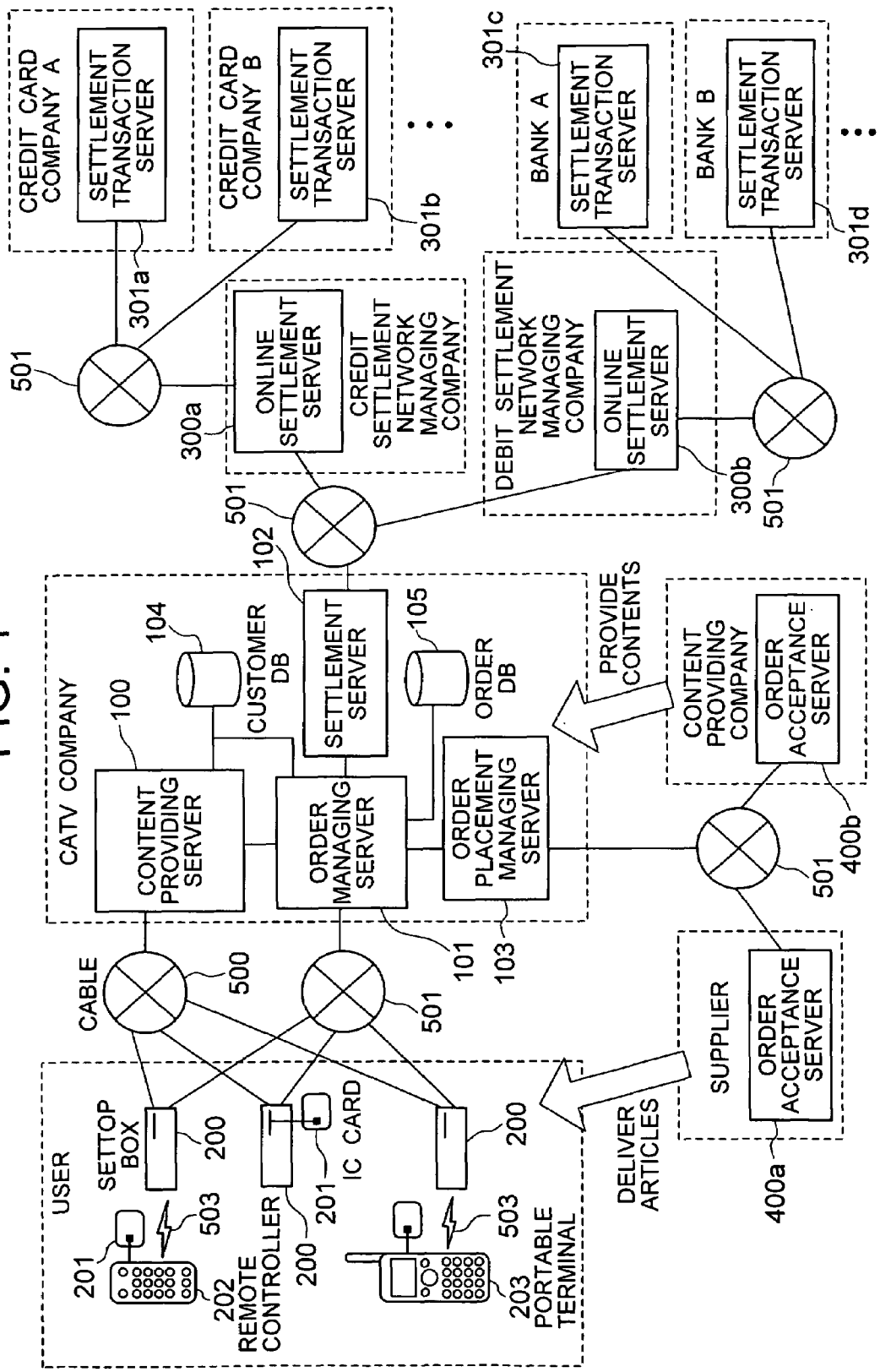
FIG. 1 is a diagram showing an overall configuration of a first embodiment of a settlement transaction system using a digital broadcast according to the present invention.

FIG. 1 shows an overall configuration of the embodiment of a settlement transaction system using digital broadcasting. The system in which a broadcasting station provides article or item information (to be referred to as a content hereinbelow) such as an image of an article used, for example, in a broadcast program and a TV shopping broadcast and the user receives the information using a dedicated tuner, specifically, a settop box is configured to provide a settlement transaction method using an IC card via a network. In the embodiment, a CATV company is selected as the broadcasting station and the system allows settlement using an IC card as well as settlement using a debit card. In the example, the user conducts settlement using IC card credit. However, this is only an example to explain the present invention. That is, the present invention is applicable to various configurations using digital broadcasting of communication satellites, broadcast satellites, and a broadcast facility using ground waves and to various settlement methods or ways other than credit settlement such as debit settlement, accounting settlement, and electronic money settlement.

The configuration of FIG. 1 includes a content providing server 100 for the CATV company to provide contents, an order managing server 101, a settlement server 102 for executing settlement transaction using an IC card via a network, an order placement managing server 103, a customer database 104, an order placement database 105, a settop box 200 disposed as a dedicated tuner for the user to receive contents from the CATV company, an IC card 201 of the user, and a remote controller or control 202. The system further includes a portable terminal 203, an online settlement server 300a to carry out online credit settlement, an online settlement server 300b to conduct online debit settlement, settlement transaction servers 301a and 301b for respective credit card brands, settlement transaction servers 301c and 301d of respective banks to conduct debit settlement, an order acceptance server 400a under control of a company selling articles ordered by the user, an order acceptance server 400b under control of a content providing company which produces, as contents for CATV, information of articles such as images of articles to be used, for example, in the TV shopping and which provides the contents, a dedicated cable 500 to provide digital broadcasting, and a communication network 501 such as a telephone network, a dedicated network, or the internet.

The content providing server 100 can communicate via a dedicated cable 500 with a settop box 200 of the user. The order managing server 101 can communicate via the communication network with a settop box 200 of the user.

The system has many users and each user possesses at least one IC card 201 for settlement. Ordinarily, although not necessarily, one remote control 202 is used for each settop box 200 or one portable terminal 203 is used for each user. The portable terminal may be an information processor of any configuration such as a personal digital assistant (PDA), a portable telephone set, any other portable information processing device, or an exclusive information processing device dedicated to the present system.

Each of the settop box 200, the remote control 202, and the portable terminal 203 includes an IC card reading and writing (R/W) function. The function is used to read information necessary for settlement from the IC card 201 of the user and to write information necessary for settlement on the IC card 201. The settop box 200, the remote control 202, and the portable terminal 203 can communicate information via narrow-band wireless communication 503 with each other.

Figure 2:
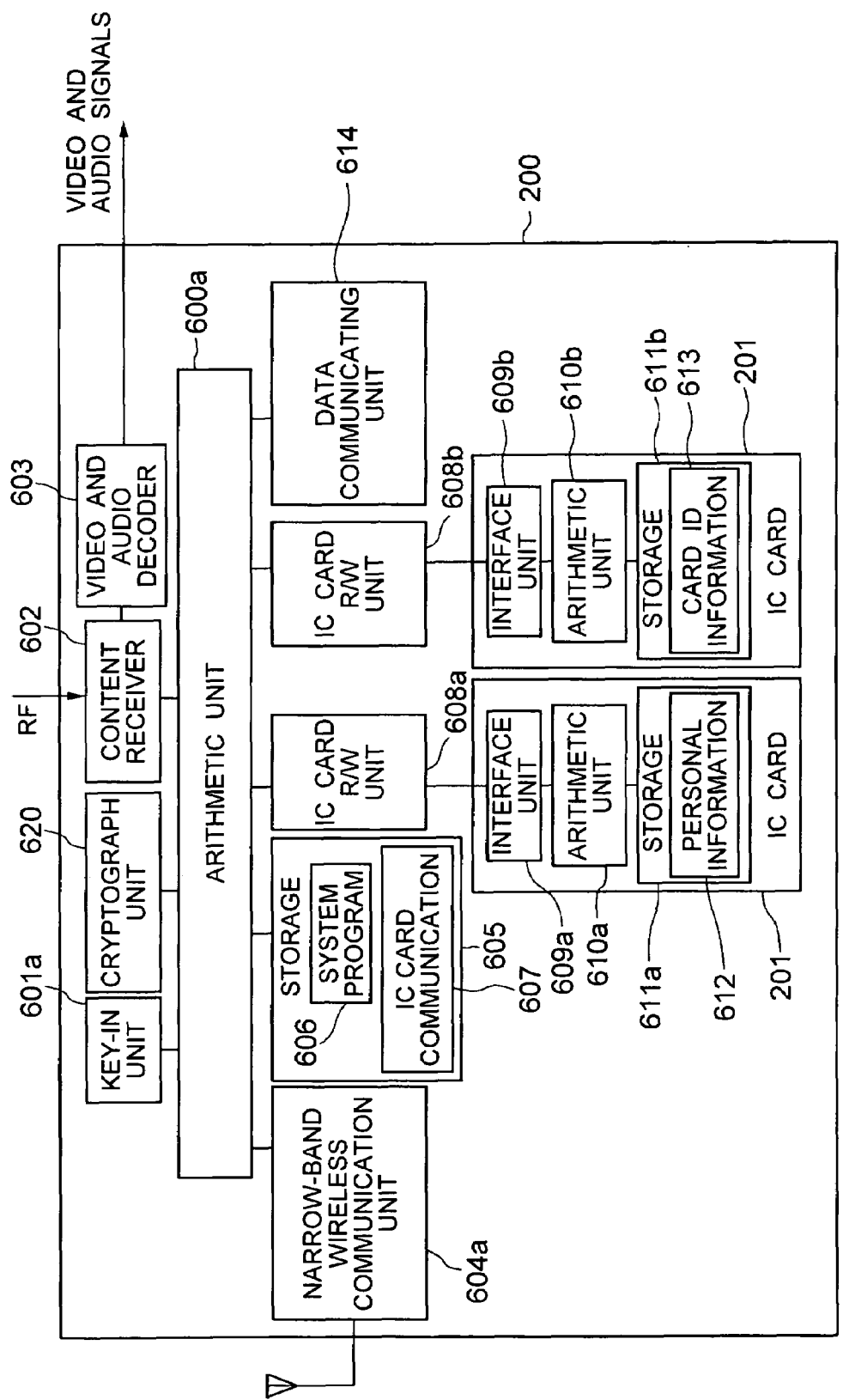
FIG. 2 is a diagram showing internal configurations respectively of a settop box 200 and an IC card 201 in the embodiment of the system.

FIG. 2 shows inner configurations of the settop box 200 and the IC card 201 of the embodiment.

The settop box 200 includes an arithmetic unit 600a which controls overall operation of the settop box 200 and which conducts various operations such as judgement, arithmetic operation, and control operation; a key-in unit 601a, a content receiving unit or receiver 602 to receive contents, a video/audio decoder 603, a narrow-band wireless communication unit 604a to directly conduct wireless communication, specifically, narrow-band wireless communication 503 with an external device, a storage 605, a settop box (STB) system program 606 and an IC card communication program 607 to communicate with an IC card (which are loaded in the storage 605), an IC card reading and writing (R/W) unit 608a to access an IC card 201 required to use pay contents via cable television (CATV), an IC card R/W 608b to access an IC card 201 required to execute settlement transaction, a data communicating unit 614 to communicate information via the communication network 501 with an external device, and a cryptograph unit 620.

The IC cards 201 respectively include contact interfaces, namely, interface units 609a and 609b, arithmetic units 610a and 610b, and storages 611a and 611b. The IC card 201 required to use pay contents via CATV includes personal information 612 to control pay content usage information of the user. The IC card 201 required to conduct settlement transaction includes card identifier information 613 for the settlement transaction.

Figure 3:
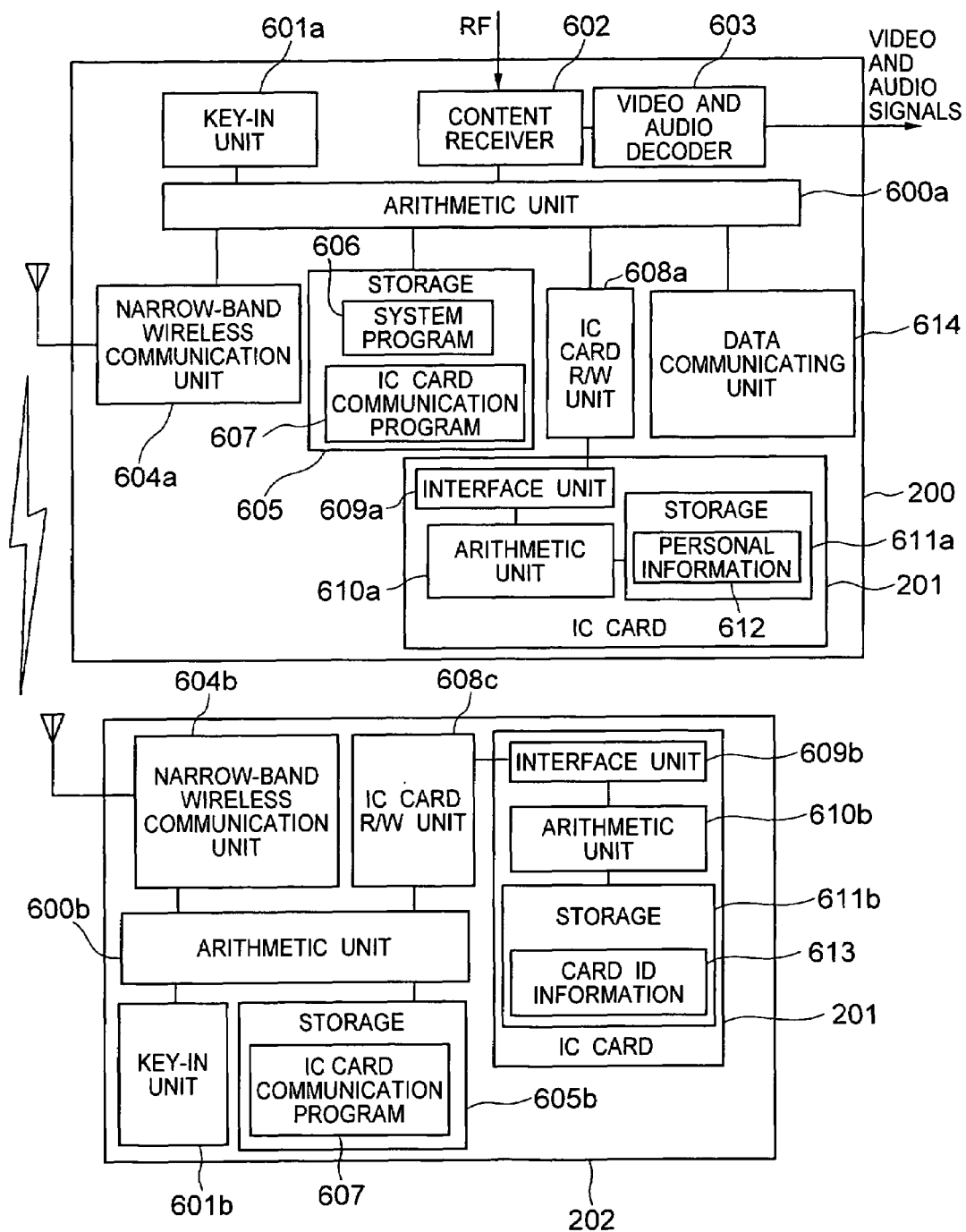
FIG. 3 is a diagram showing internal configurations respectively of a settop box 200, IC cards 201, and a remote controller or control to operate the settop box 200 in the embodiment of the system.

FIG. 3 shows internal configurations respectively of the settop box 200, the IC cards 201, and the remote control 202 to operate the settop box 200 in the embodiment.

In the configuration, the IC card 201 necessary for the settlement is arranged in the remote control 202 to operate the settop box 200. That is, the internal configuration of the settop box 200 is similar to that shown in FIG. 2 excepting the IC card 201 for the settlement and the IC card R/W unit 608b to access the IC card 201.

Also, the internal configuration of the IC card 201 necessary for the settlement is similar to that shown in FIG. 2.

The remote control 202 includes an arithmetic unit 600b, a key-in unit 601b, a narrow-band wireless communication unit 604b to directly conduct wireless communication, specifically, narrow-band wireless communication 503 with an external device, a storage 605b, an IC card communication program 607 to communicate with an IC card (which are loaded in the storage 605), and an IC card R/W unit 608c to access the IC card 201 for the settlement transaction.

Figure 4:
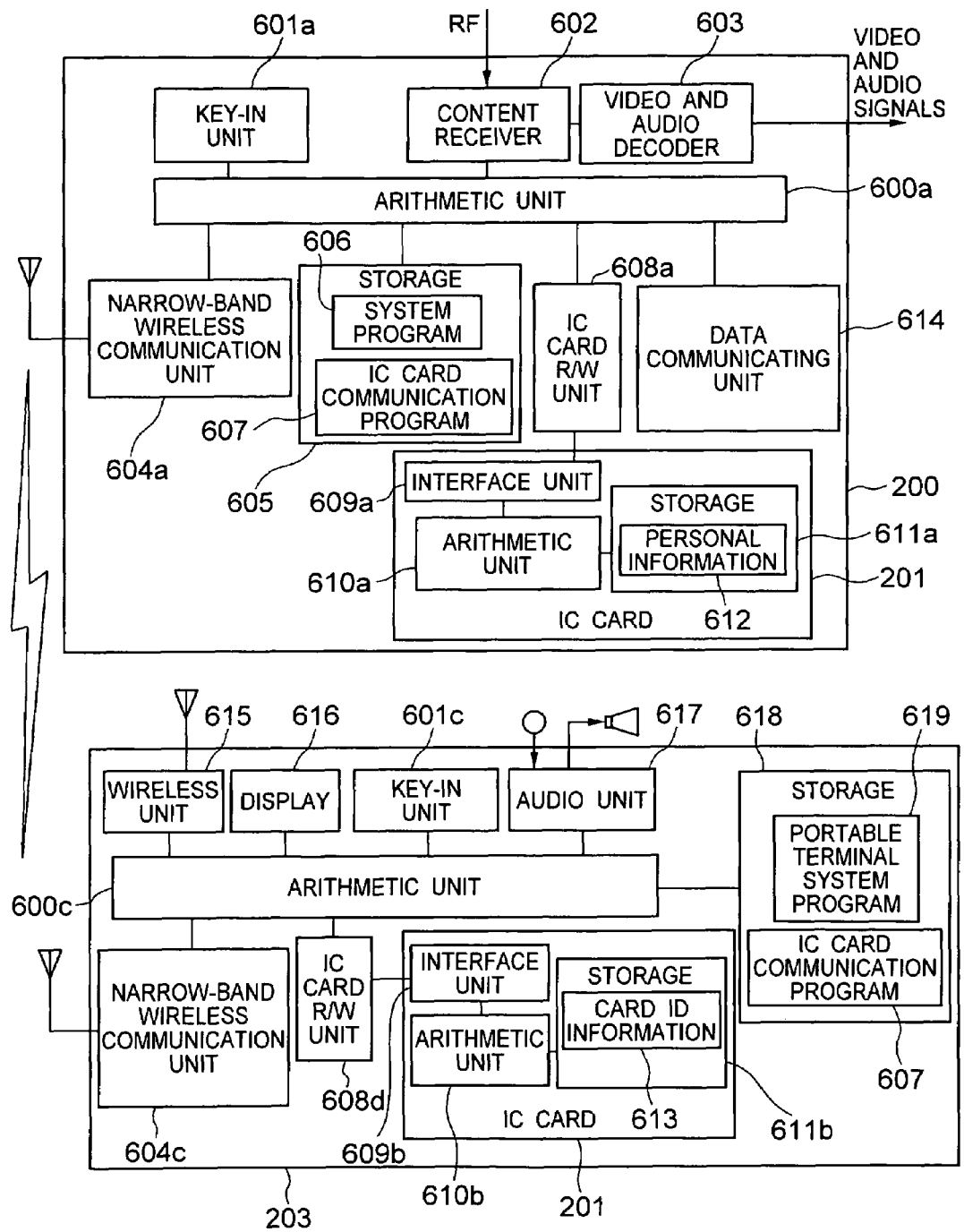
FIG. 4 is a diagram showing internal configurations respectively of a settop box 200, IC cards 201, and a portable terminal 203 of a user in the embodiment of the system.

FIG. 4 shows internal configurations respectively of the settop box 200, the IC cards 201, and the portable terminal 203 of the user of the embodiment.

In the configuration, the IC card 201 necessary for the settlement is disposed in the portable terminal 203 of the user. Therefore, the internal configuration of the settop box 200 is similar to that shown in FIG. 2 excepting the IC card 201 for the settlement and the IC card R/W unit 608b to access the IC card 201.

Additionally, the internal configuration of the IC card 201 necessary for the settlement is similar to that shown in FIG. 2.

The portable terminal 203 includes an arithmetic unit 600c, a key-in unit 601c, a narrow-band wireless communication unit 604c to directly conduct wireless communication, specifically, narrow-band wireless communication 503 with an external device, an IC card R/W unit 608d to access the IC card 201 for the settlement, a wireless unit 615 to conduct wireless communication with a base station, a display 616, an audio unit 617 connected to a speaker and a microphone, a storage 618, and a portable terminal system program 619 and an IC card communication program 607 to communicate with an IC card (which are loaded in the storage 618).

Figure 5:
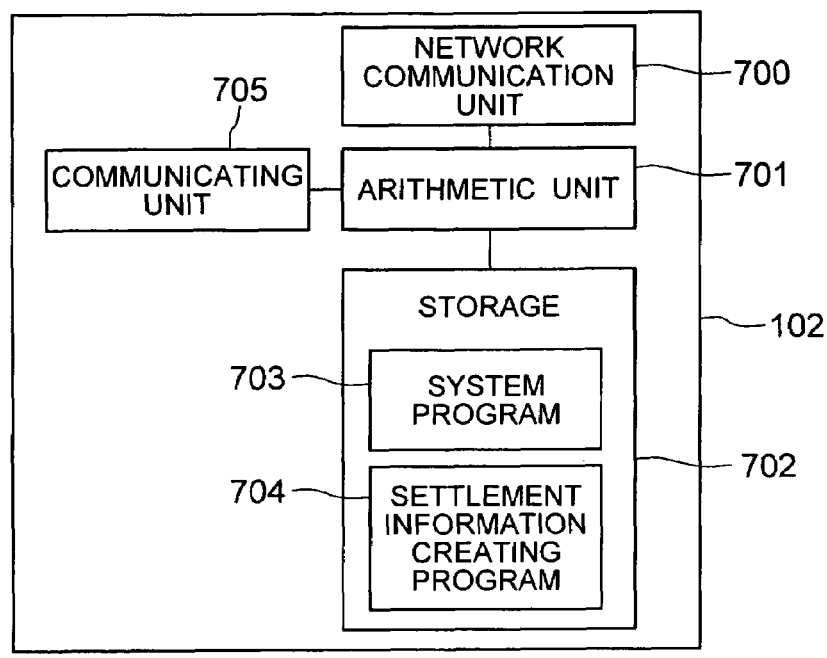
FIG. 5 is a diagram showing an internal configuration of a settlement server 102 in the embodiment.

FIG. 5 shows an internal configuration of the settlement server 102 in the embodiment. The server 102 includes a network communication unit 700 to communicate information such as settlement information via a communication network with an external device, an arithmetic unit 701 which controls overall operation of the settlement server 102 and which conducts various operations such as judgement, arithmetic operation, and control operation; a storage 702, a settlement server system program 703 and a settlement information creating program 704 to conduct settlement using an IC card (which are loaded in the storage 702), and a communicating unit 705 to communicate information with other devices under control of a CATV company.

Figure 6:
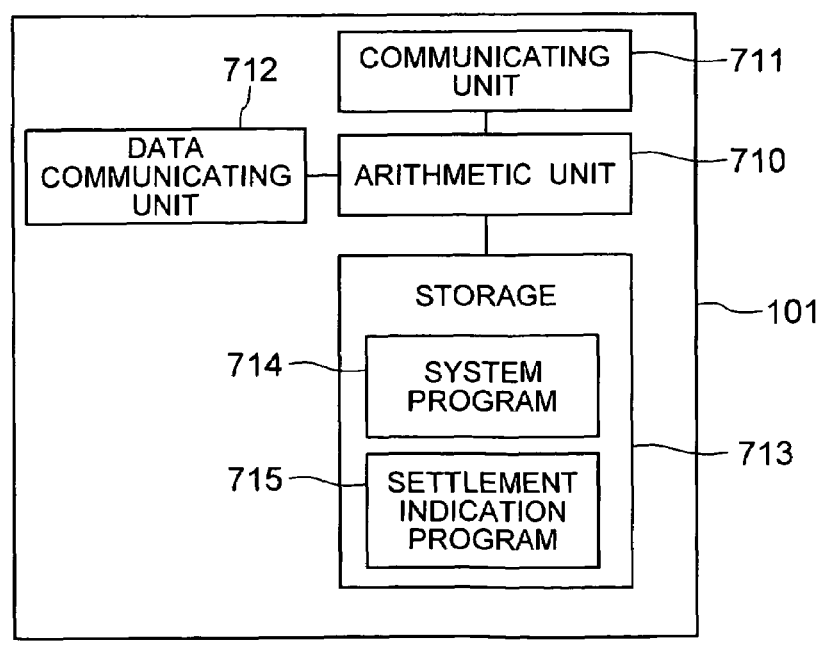
FIG. 6 is a diagram showing an internal configuration of an order managing server 101 in the embodiment.

FIG. 6 shows an internal configuration of the order managing server 101 in the embodiment. The server 101 includes an arithmetic unit 710 which controls overall operation of the server 101 and which conducts various operations such as judgement, arithmetic operation, and control operation; a communicating unit 711 to communicate information with other devices under control of a CATV company, a data communicating unit 712 to communicate information with the receiver, a storage 713, an order managing server system program 714 and a settlement indication program 715 to indicate settlement transaction using an IC card (which are loaded in the storage 713).

FIG. 7 shows an example of the customer database (DB) 104 including customer information of users each having made a contract as a subscriber of cable television with a CATV company. The customer information includes, for example, a customer identifier (ID) 800 assigned to an associated customer, an address of the customer 802 such as a mail address, a telephone number, or an address, and a settlement scheme 803 indicating a scheme or type of settlement available for the customer.

FIG. 8 shows an example of the order placement database 105 including order placement information such as an ordered article which has been ordered by the customer and of which an order has been completely placed. The order placement information includes, for example, a customer identifier 800, a transaction number 900 uniquely assigned to each settlement, an item number 901 indicating an identifier uniquely assigned to an article purchased by the customer, a unit price 902 of the article, a quantity 903 indicating the number of articles purchased by the customer, a settlement amount 904 indicating an amount of the associated articles, a settlement scheme 905 indicating a type of settlement desired by the customer, and a monthly settlement amount 906.

FIGS. 9A to 9H show specific examples of layouts of texts communicated between the order managing server 101 and the settop box 200, between the order managing server 101 and the content providing server 100, and between the order managing server 101 and the settlement server 102.

As can be seen from FIGS. 9A to 9H, the texts includes an item selection text 1000, a settlement confirmation text 1003, a confirmed information text 1005, a settlement start text 1007, a settlement completion text 1009, a completion confirmation text 1011, an order placement text 1013, and an order placement completion text 1015. Each text layout includes a text identifier code or includes a text identifier code and information data.

The item selection text 1000 shown in FIG. 9A is a text indicating item information of items or articles to be purchased by the user. The text is transmitted from the settop box 200 via the communication network 501 to the order managing server 101. The text includes a text identifier code 1001 indicating that the text is an item selection text, a terminal identifier (ID) 1002 uniquely assigned to the settop box 200, an item number 901 of items to be purchased by the customer, a unit price 902 of the items, a quantity 903 of the items, a settlement amount 904 indicating a total amount of the items to be purchased, and a settlement type 905 of settlement desired by the customer.

The settlement confirmation text 1003 of FIG. 9B is a text indicating item information of items to be purchased by the customer or the user. The text is sent from the order managing server 101 to the content providing server 100. The text includes a text identifier code 1004 indicating that the text is a settlement confirmation text, a terminal identifier (ID) 1002 uniquely assigned to the settop box 200, an item number 901 of items to be purchased by the customer, a unit price 902 of the items, a quantity 903 of the items, a settlement amount 904 indicating a total amount of the items to be purchased, and a settlement type 905 of settlement desired by the customer.

The confirmed information text 1005 of FIG. 9C is a text indicating item information of items which have been confirmed for the purchase by the customer. The text is sent from the settop box 200 via the network 501 to the order managing server 101. The text includes a text identifier code 1005 indicating that the text is a confirmed information text, a terminal identifier (ID) 1002 uniquely assigned to the settop box 200, an item number 901 of items to be purchased by the customer, a unit price 902 of the items, a quantity 903 of the items, a settlement amount 904 indicating a total amount of the items to be purchased, and a settlement type 905 of settlement desired by the customer.

The settlement start text 1007 of FIG. 9D is a text notifying that settlement is started for the items of which the purchase is confirmed by the customer. The text is sent from the order managing server 101 to the settlement server 102. The text includes a text identifier code 1008 indicating that the text is a settlement start text, a terminal identifier (ID) 1002 uniquely assigned to the settop box 200, an item number 901 of items to be purchased by the customer, a unit price 902 of the items, a quantity 903 of the items, a settlement amount 904 indicating a total amount of the items to be purchased, and a settlement type 905 of settlement desired by the customer.

The settlement completion text 1009 of FIG. 9E is sent from the settlement server 102 to the order managing server 101 to notify that the settlement transaction has been completed. The text includes a text identifier code 1010 indicating that the text is a settlement completion text and a terminal identifier (ID) 1002 uniquely assigned to the settop box 200.

The completion confirmation text 1011 of FIG. 9F is sent from the order managing server 101 to the content providing server 100 to notify that settlement has been completed. The text includes a text identifier code 1012 indicating that the text is a completion confirmation text, a terminal identifier (ID) 1002 uniquely assigned to the settop box 200, a transaction number 900 uniquely assigned to each settlement, an item number 901 of items to be purchased by the customer, a unit price 902 of the items, a quantity 903 of the items, a settlement amount 904 indicating a total amount of the items to be purchased, and a settlement type 905 of settlement desired by the customer.

The order placement text 1013 of FIG. 9G is sent from the order managing server 101 to the order placement managing server 103 to notify that the ordering operation is started after the settlement is finished. The text includes a text identifier code 1014 indicating that the text is an order placement text, a customer identifier 800, a transaction number 900 uniquely assigned to each settlement, an item number 901 of items to be purchased by the customer, a unit price 902 of the items, a quantity 903 of the items, a settlement amount 904 indicating a total amount of the items to be purchased, and a settlement type 905 of settlement desired by the customer.

The order placement completion text 1015 of FIG. 9H is sent from the order placement managing server 103 to the order managing server 101 to notify that the ordering operation has been completed. The text includes a text identifier code 1017 indicating that the text is an order placement completion text and a customer identifier 800.

It is not necessarily required that each of the item selection text 1000, the settlement confirmation text 1003, the confirmed information text 1005, the settlement start text 1007, and a completion confirmation text 1011 includes all information data items of the item number 901, the unit price 902, the quantity 903, the settlement amount 904, and the settlement type 905. It is also possible to use a text data layout including the terminal identifier 1002 and the item number 901 such that the order managing server 101 includes an item information database to manage item information associated with the item number 901. The item information includes, for example, the unit price 902, the quantity 903, the settlement amount 904, and the settlement type 905. However, the item information database is not shown in the drawings.

FIGS. 10A to 10D show specific example of layouts of texts communicated between the settlement server 102 and the settop box 200.

As shown in these layouts, the texts include an IC card communication text 1100, an IC card communication reply text 1103, an IC card communication program initiation text 1105, and an initiation completion text 1107. Each text includes a text identifier code and information data.

Figure 10A:
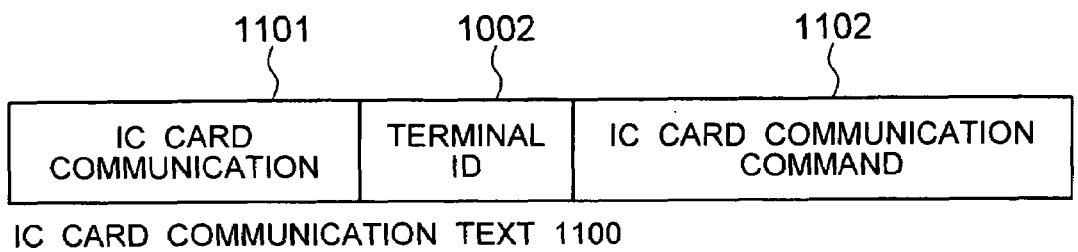
FIGS. 10A to 10D are diagrams showing specific examples of layouts of texts communicated between the settlement server 102 and the settop box 200.

The IC card communication text 1100 shown in FIG. 10A is a text sent from the settlement server 102 to the settop box 200. The text 1100 is used to send a command text to conduct communication with an IC card. The text 1100 includes a text identifier code 1101 indicating that the text is an IC card communication text, a terminal identifier 1002, and an IC card communication command 1102 to communicate with an IC card.

Figure 10B:
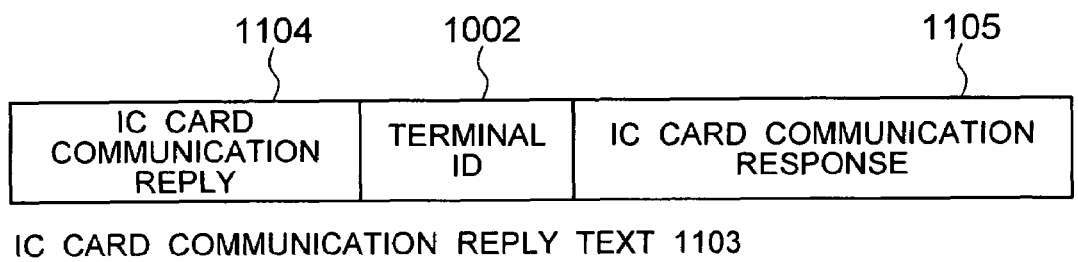

The IC card communication reply text 1103 of FIG. 10B is sent from the settop box 200 to the settlement server 102 to send a response text resultant from the communication processing with the IC card. The text 1103 includes a text identifier code 1104 indicating that the text is an IC card communication reply text, a terminal identifier 1002, and an IC card communication response 1105 sent from the IC card as a result of the communication processing.

Figure 10C:
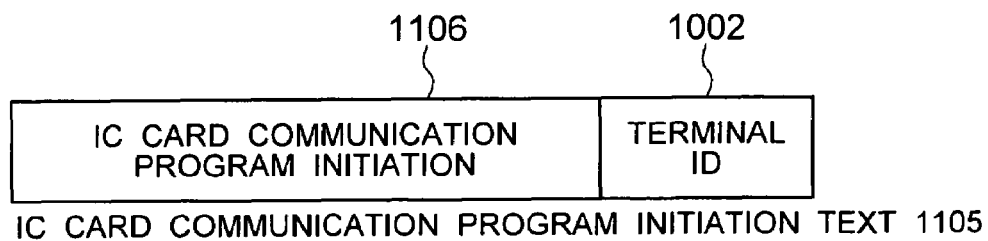

The IC card communication program initiation text 1105 of FIG. 10C is a text to indicate a terminal including an IC card communication program to initiate the program. The text 1105 includes a text identifier code 1106 indicating that the text is an IC card communication program initiation text and a terminal identifier 1002.

Figure 10D:
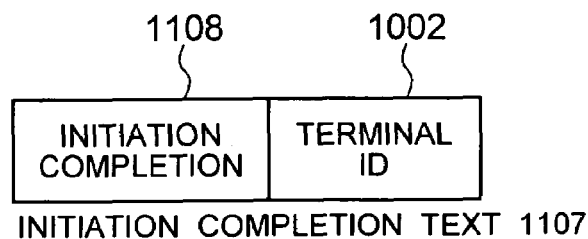

The initiation completion text 1107 of FIG. 10D is a text used by the terminal including an IC card communication program to notify that the IC card communication program has been completely initiated. The text 1107 includes a text identifier code 1108 indicating that the text is an initiation completion text and a terminal identifier 1002.

Referring next to FIG. 11, description will be given of operation of the embodiment.

FIG. 11 is a flowchart of a processing flow in which the embodiment of the system executes settlement transaction when a user selects a desired article using the settop box 200 from a TV shopping program of a digital broadcast.

There also exist other cases, for example, a case in which the user only televiews a digital broadcast program without desiring purchase of articles and a case in which the user interrupts settlement transaction after selecting articles to be purchased using the settop box 200. Therefore, the processing flow of FIG. 11 can be terminated at any intermediate step in the flow. However, the event of such termination is not shown in the drawings and will not be described.

In step S1200, the content providing server 100 sends a content including item information such as an image of items put for sale in a TV shopping program via the dedicated cable 500 to the settop box 200 of each user according to a predetermined broadcasting method.

In step S1201, the settop box 200 receives the content and displays the content of item for sale on a predetermined display device such as a television terminal. This embodiment uses a television set as the display device.

In step S1201, the user televiews on the television set the content of item for sale sequentially sent from the server 100. When the shopping program displays items desired by the user, the process goes to step S1202.

In step S1202, the user operates the key-in unit 601a of the settop box 200 to display the items on the television screen and determines the quantity of the items to be purchased and the settlement type for the purchase. In this situation, the system displays a screen image shown as an example in FIG. 13.

Figure 13:
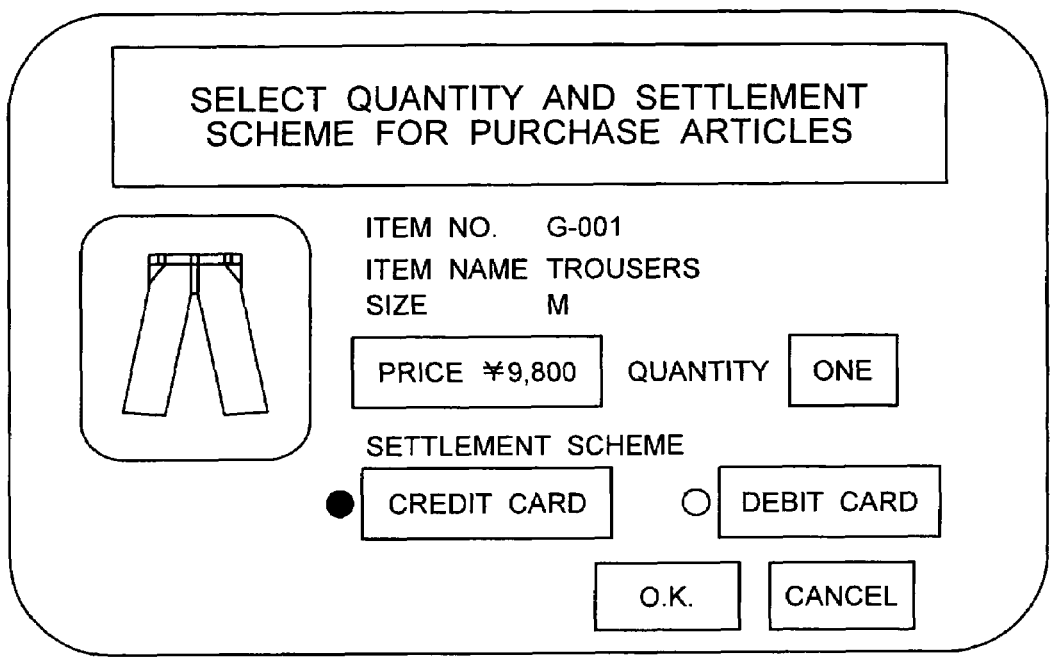
FIG. 13 is a diagram showing a specific example of a screen image for the user to input a quantity of desired articles to be purchased and a type of settlement for the purchase.

In step S1201, when the user selects "O.K." in the screen of FIG. 13 using the key-in unit 601a of the settop box 20, control goes to step S1203.

In step S1203, the settop box 200 creates an item selection text 1000 and sends the text from the data communication unit 614 to the order managing server 101. In this operation, the text 1000 includes information data of an item number 901, a unit price 902, a quantity 903, a settlement amount 904, and a settlement type 905 of the articles desired by the user for the purchase.

In step S1203, the order-managing server 101 receives the text 1000 from the settop box 200, and then control goes to step S1204.

In step S1204, the server 101 creates a settlement confirmation text 1003 and sends the text from the network communication unit 700 to the content providing server 100. Information data of the text 1003 is substantially the same as that of the item selection text 1000.

In step S1204, the server 100 receives the text 1003 from the order managing server 101, and the process goes to step S1205.

Figure 14:
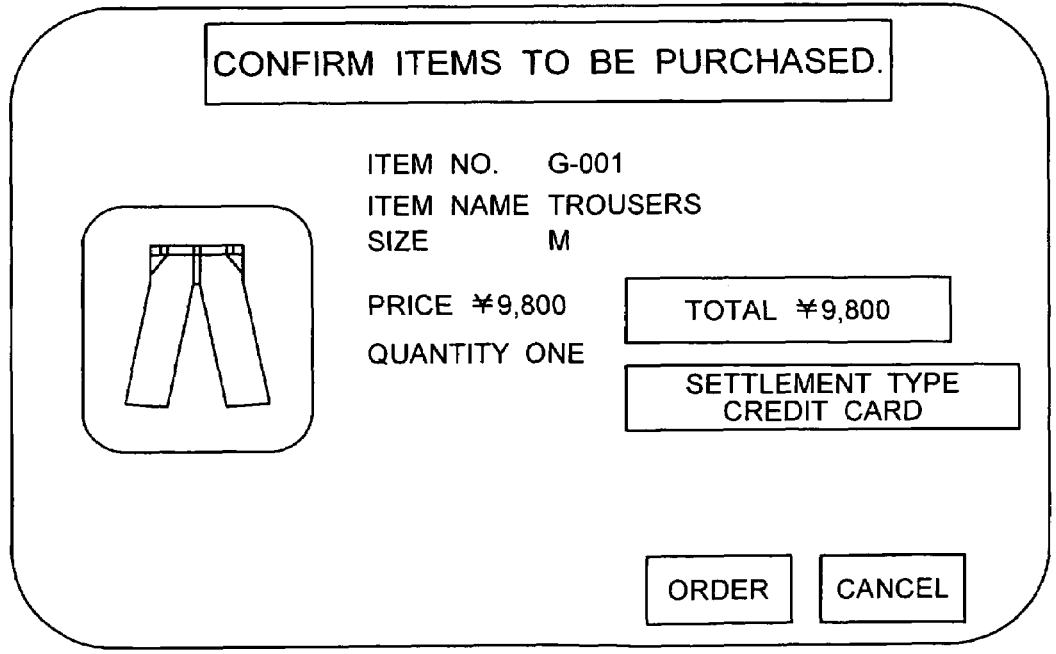
FIG. 14 is a diagram showing a specific example of a settlement confirmation screen image for the user to confirm detailed information of desired articles to be purchased.

In step S1205, the content providing server 100 sends to the settop box 200 predetermined content information to display a settlement confirmation screen as shown in FIG. 14.

In step S1205, the settop box 200 receives the predetermined content information to display the settlement confirmation screen from the server 100, and control goes to step S1206.

In step S1206, the settop box 200 receives the content and displays the settlement confirmation image of FIG. 14 on the TV screen, and the process goes to step S1207.

In step S1207, the user watches the settlement confirmation screen of FIG. 14 to confirm detailed information of items to be purchased. If the confirmation is correctly finished, the user selects "Order" in the screen using key-in unit 601a of the settop box 20. Then, control goes to step S1208.

In step S1208, the settop box 200 creates a confirmed information text 1005 and sends the text from the data communicating unit 614 to the order managing server 101. The text 1005 includes information data of an item number 901, a unit price 902, a quantity 903, a settlement amount 904, and a settlement type 905 of the articles which are desired by the user for the purchase and which have been confirmed by the user on the settlement confirmation screen of FIG. 14.

If the user does not desire settlement in step S1207 and selects "Cancel" using key-in unit 601a of the settop box 20, the system interrupts the processing for the purchase of items. However, for easy understanding of operation of the embodiment, the user can only select "Cancel" if the detailed information of items desired by the user for the purchase includes an error. However, the processing procedure may include an additional step to correct the detailed information of items desired by the user for the purchase.

In step S1208, the order managing server 101 receives the confirmed information text 1005 from the settop box 200, and the process goes to settlement (1) enclosed by dot-and-dash lines. Settlement (1) will be described in detail later in conjunction with FIG. 12. In the procedure, settlement (1) starts when the server 101 sends a settlement start text 1007 to the settlement server 102. Thereafter, the settlement transaction 1210 is executed by the IC card 201, the settop box 200, the settlement server 102, and the online settlement server 300a. After the settlement transaction 1210 is finished, when the server 101 receives a settlement completion text 1009 from the settlement server 102, settlement (1) is finished. Control then goes to step S1214.

In step S1214, the order managing server 101 generates a completion confirmation text 1011 and sends the text from the network communication unit 700 to the content providing server 100. The text 1011 includes data items similar to those of the confirmed information text 1005. The text 1011 includes a transaction number which is an identifier uniquely assigned by the settlement transaction 1210.

In step S1214, the content providing server 100 receives the completion confirmation text 1011 from the order managing server 101, and the process goes to step S1215.

Figure 15:
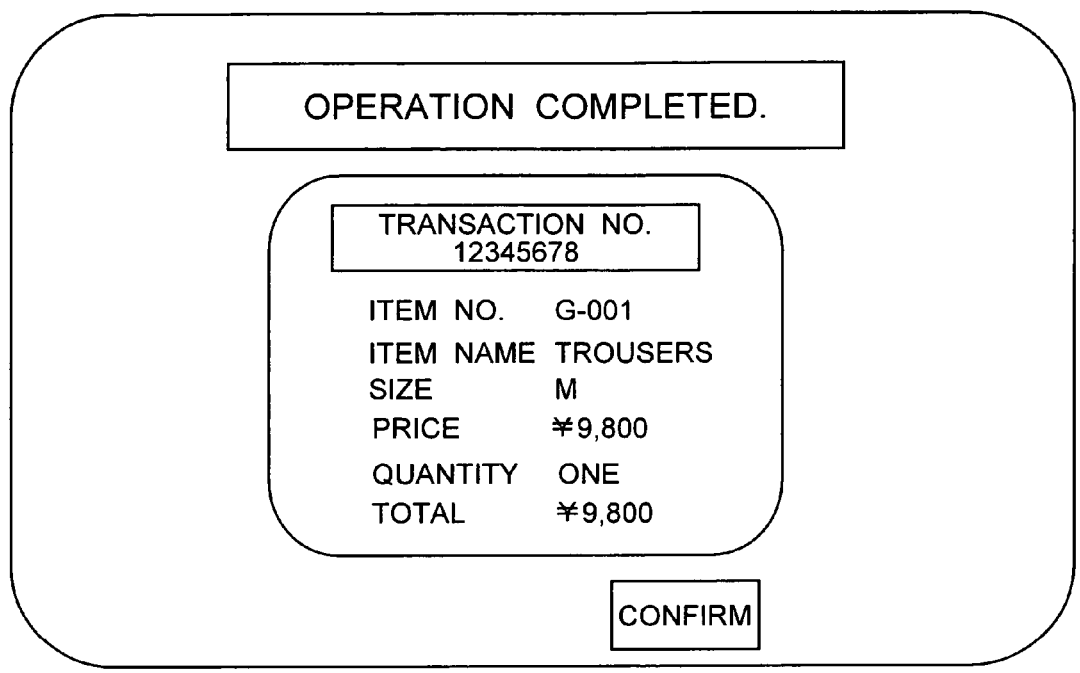
FIG. 15 is a diagram showing a specific example of a settlement completion screen image to notify completion of the settlement of purchased articles to the user.

In step S1215, the server 100 sends to the settop box 200 predetermined content information to display a settlement completion screen shown by way of illustration in FIG. 15.

In step S1215, when the settop box 200 receives the content information to display the settlement completion screen, control goes to step S1216.

In step S1216, the settop box 200 receives the content and displays the settlement completion screen of FIG. 15 on the TV screen, and the process goes to step S1217.

In step S1217, the order managing server 101 generates a order placement text 1013 and sends the text from the network communication unit 700 to the order placement managing server 103. The text 1013 includes data items similar to those of the completion confirmation text 1011. The text 1013 includes a customer identifier 800 corresponding to the terminal identifier 1002 obtained from the customer database 104.

In step S1217, the server 103 receives the order placement text 1013 from the order placement managing server 103, and control goes to step S1218.

In step S1218, the server 103 executes predetermined order placement processing via the network communication unit 700 for the order acceptance server 400a under control of a supplier or a company selling items desired by the user.

It is also possible that the order placement managing server 103 executes predetermined order placement processing via the network communication unit 700 for the order acceptance server 400a under control of a content providing company creating and providing contents of the TV shopping. Thereafter, the content providing company executes predetermined order placement processing for the order acceptance server 400a under control of the supplier selling items desired by the user.

In step S1218, when the order placement managing server 103 completely executes the order placement processing, the process goes to step S1219.

In step S1219, the server 103 creates an order placement completion text 1015 and sends the text from the network communication unit 700 to the order managing server 101.

In step S1219, the server 101 receives the text 1015 from the order placement managing server 103, and control goes to step S1220.

In step S1220, the order managing server 101 stores in the order placement database 105 the transaction number 900, the item number 901, the unit price 902, the quantity 903, the settlement amount 904, the settlement type 905, and the monthly total amount 906 obtained from the order placement information for which the settlement transaction and the order placement processing have been completed.

When an order is received as a result of the order placement processing, the supplier delivers to the user the items desired by the user as above.

Figure 12:
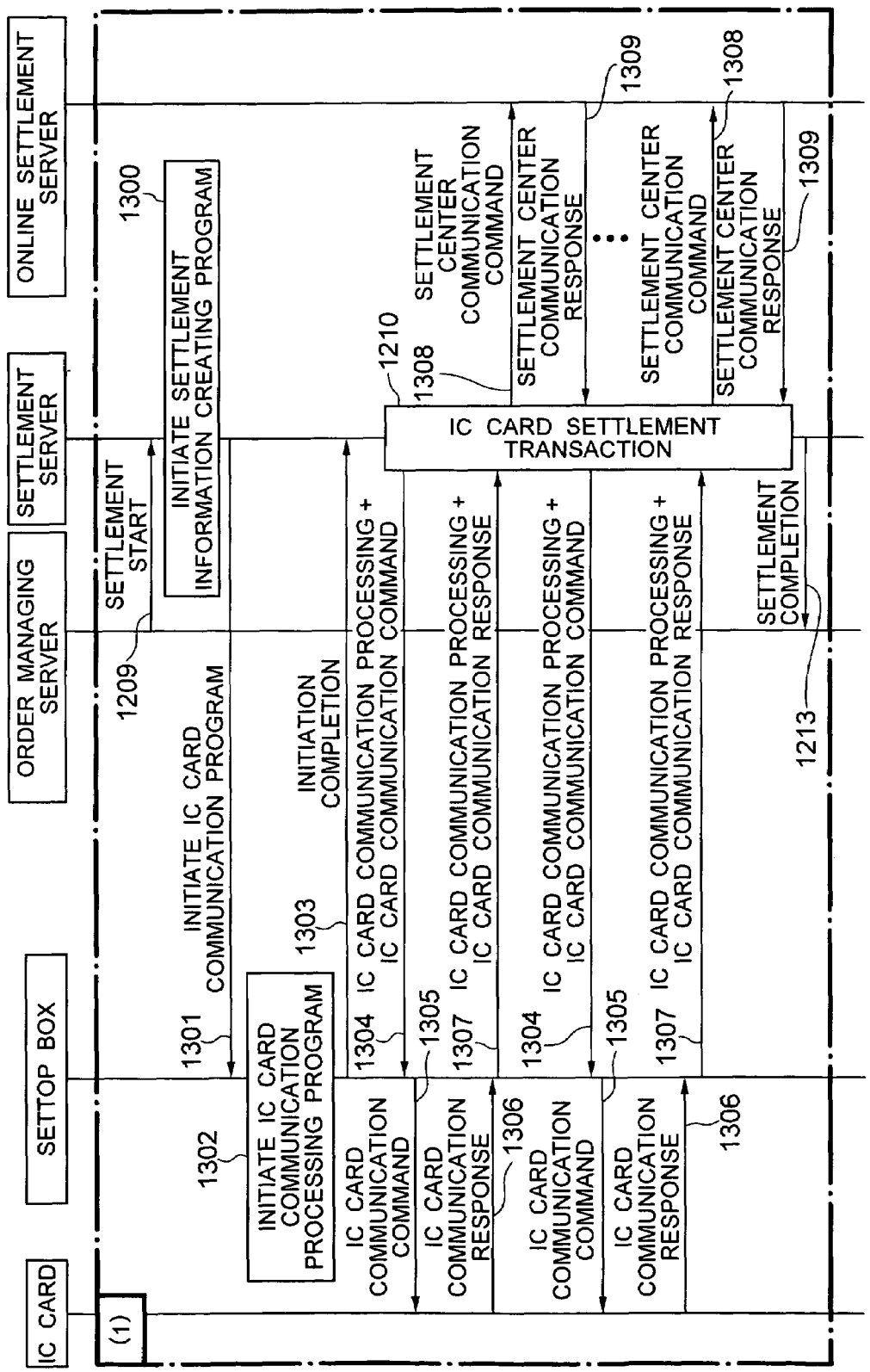

FIG. 12 shows a flowchart of the settlement transaction 1210 executed using the IC card 201, the settop box 200, the settlement server 102, and the online settlement server 300a when the settlement type is "IC card credit".

At timing of step S1209 of FIG. 11, the order managing server 101 sends a settlement start text 1007 to the settlement server 102.

In step S1209, the server 102 receives the text 1007 from the order managing server 101, and the process goes to step S1300.

In step S1300, the settlement server 102 initiates the settlement information creating program 704 stored in the storage 702, and control goes to step S1301.

In step S1301, the server 102 sends an IC card communication program initiation text 1105 to the settop box 200.

In step S1301, the settop box 200 receives the text 1105 from the settlement server 102, and the process goes to step S1302.

In step S1302, the settop box 200 initiates an IC card communication processing program 607 in the storage 605 and proceeds to step S1303.

In step S1303, the settop box 200 sends an initiation completion text 1107 to the settlement server 102.

In step S1303, the server 102 receives the text 1107 from the settop box 200, and control goes to settlement transaction 1210.

In the settlement transaction 1210, the settlement server 102 repeatedly executes communication processing with the IC card 201 and the online settlement server 300a according to a predetermined procedure to resultantly execute the settlement transaction. The predetermined procedure of settlement transaction conforms to, for example, specifications for credit and debit transaction of Europay, Mastercard, and Visa (EMV) stipulating a processing procedure and text items for IC card credit.

In the following description, the settlement transaction will be described according to the EMV specifications for easy understanding of the settlement processing.

The EMV specifications include "type approval" as a terminal approval scheme. The type approval has two levels, i.e., level 1 and level 2. When the EMV type approval is applied to the embodiment, functions at level 1 are assigned to the settop box 200 of FIG. 2 and functions at level 2 are assigned to the settlement server 102 of FIG. 5.

"EMV2000 Integrated Circuit Card Specification for Payment Systems" and "EMV'96 Integrated Circuit Card Specification for Payment Systems" stipulate the functions at levels 1 and 2 of EMV type approval.

In step S1304, the settlement server 101 collects text items required by the EMV specifications to form an IC card communication command 1102 to generate an IC card communication text 1100 including the command 1102 and sends the text 1100 to the settop box 200.

For the IC card communication command 1102, the settlement server 101 may use, for example, an application protocol data unit (APDU) to create the IC card communication text 1100.

In step S1304, when the settop box 200 receives the text 1100 from the server 101, control proceeds to step S1305.

In step S1305, the step S1305 sends the IC card communication command 1102 of the text 1100 to the IC card 201.

In step S1305, the IC card 201 receives the command 1102 from the settop box 200, and control goes to step S1306.

In step S1306, the IC card 201 sends to the settop box 200 an IC card communication response 1105 in reply to the command 1102.

In step S1306, the settop box 200 receives the response 1105 from the IC card 201, and the process goes to step S1307.

In step S1307, the settop box 200 creates an IC card communication reply text 1103 including the response 1105 received from the IC card 201 and sends the text 1103 to the settlement server 102.

For the response 1105, the settop box 200 may use, for example, the application protocol data unit to create the text 1103.

If it is required in the settlement procedure for the user to input a secret number, the user inputs his or her secret number from the key-in unit 601*a*. The cryptograph unit 620 encrypts data of the secret number into encrypted data. In step S1307, the settop box 200 creates an IC card communication reply text 1103 including the encrypted data of the secret number and sends the text 1103 to the settlement server 102.

It is also possible that the secret number data inputted from the key-in unit 601*a* is not encrypted but is directly set to the IC card communication reply text 1103 to be sent to the settlement server 102. In this case, the cryptograph unit 620 may be removed from the settop box 200.

Also in step S1307, the settlement server 101 treats the IC card communication response 1105 of the text 1103 as an EMV reply text item.

Thereafter, the system repeatedly executes steps S1304 to S1307 according to a predetermined processing procedure of EMV.

In steps S1308 and S1309, the settlement server 102 repeatedly communicates with the online settlement server 300*a* using predetermined text items of EMV.

When the processing is completely finished in the processing procedure of EMV, the IC card settlement transaction 1210 is terminated and control goes to step S1213.

In step S1213, the settlement server 102 sends a settlement completion text 1009 to the order managing server 101.

The predetermined processing procedure of EMV conforms to, for example, the IC credit standard, i.e., "EMV2000 Integrated Circuit Card Specification for Payment Systems" or "EMV'96 Integrated Circuit Card Specification for Payment Systems". The settlement transaction of the settlement server includes processing and judgement to be conducted by the application protocol data unit (APDU) associated with the specification.

In the predetermined processing procedure of EMV, if the settlement program of the settlement server 102 requests the user to input a secret number, the user inputs a secret number from the key-in unit 601*a* shown in FIG. 2. In this situation, if the settlement is conducted through online processing, the settlement server 102 sends the secret number to the settlement transaction server 300*a* or 300*b*. If the settlement is conducted through offline processing, the settlement server 102 sends the secret number via the settop box 200 to the IC card 201.

It is also possible in the operation that the cryptograph unit 620 of the settop box 200 encrypts the secret number.

The settop box 200 may conduct the settlement without encrypting the secret number. In this case, it is not necessarily required to arrange the cryptograph unit 620 in the settop box 200.

Figure 16:
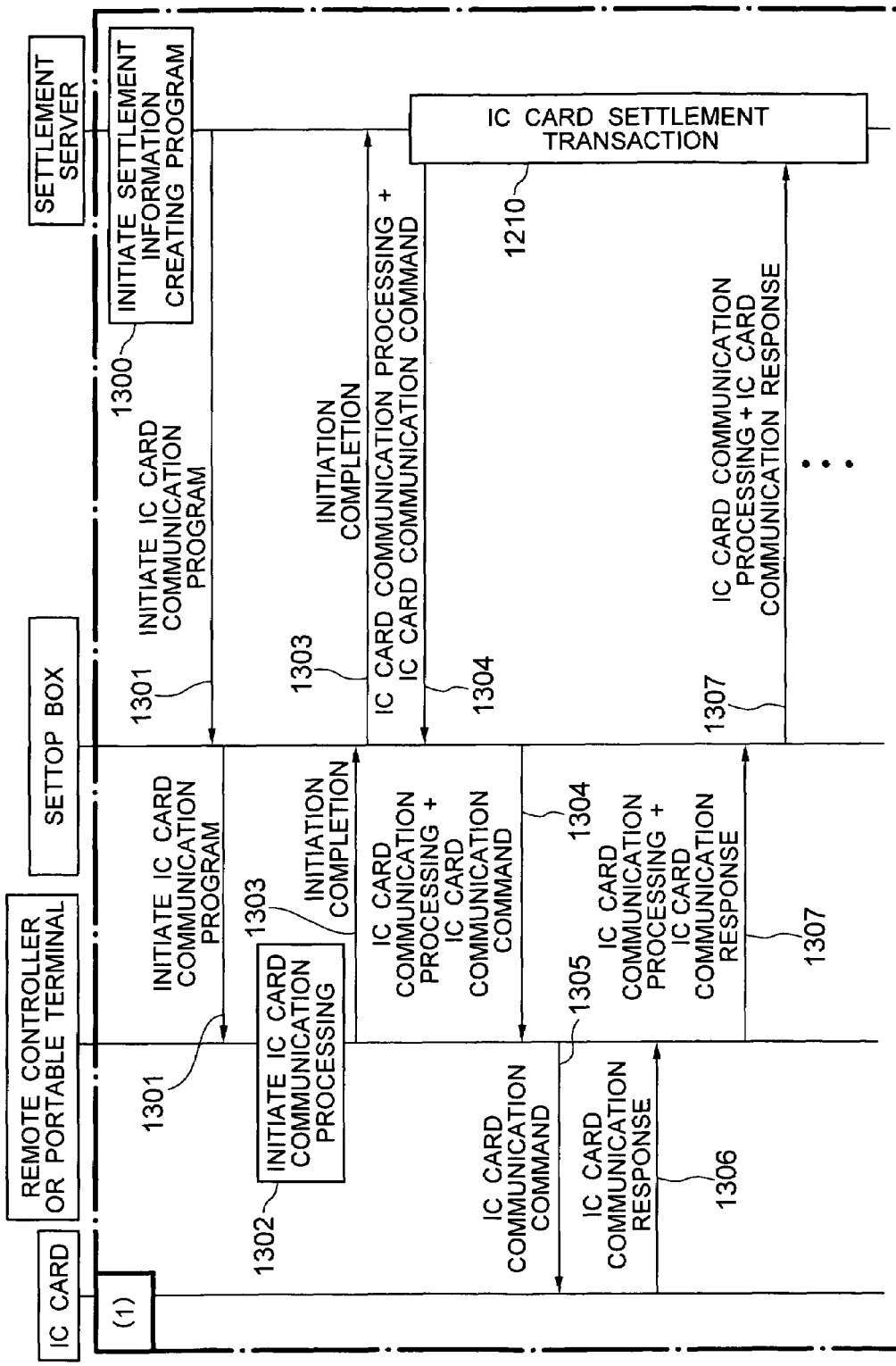

In the description, the settop box 200 integrally includes the IC card 201 for the settlement transaction as shown in FIG. 2. However, it is also possible to integrate the IC card for settlement in the remote control 202 as shown in FIG. 3. In this situation, as can be seen from FIG. 3, the remote control 202 includes the IC card communication processing program 607 to execute communication processing with the IC card. In the settlement transaction in this configuration, the remote control 202 executes as shown in FIG. 16 the processing of steps S1302, S1303, S1305, and S1307 executed by the settop box 200 in FIG. 12.

In step S1301, the settop box 200 sends the IC card communication program initiation text 1105 received from the settlement server 102 to the remote control 202 via the narrow-band wireless communication.

In step S1303, the remote control 202 transmits an initiation completion text 1107 via the narrow-band wireless communication to the settop box 200.

In step S1304, the IC card communication text 1100 from the settlement server 102 is sent via the narrow-band wireless communication to the remote control 202.

In step S1305, the remote control 202 sends the text 1100 via the wireless communication to the settop box 200.

When the texts shown in FIGS. 10A to 10D are used between the remote control 202 and the settop box 200, each text includes the terminal identifier 1002 including an identifier uniquely assigned to the remote control 202.

In the settlement procedure, if it is required for the user to input a secret number in response to a request from the settlement program 704 of the settlement server 102, the user inputs a secret number from the key-in unit 601*b* shown in FIG. 3. In this case, if the settlement is conducted through online processing, the settlement server 102 sends the secret number to the settlement transaction server 300*a* or 300*b*. If the settlement is conducted through offline processing, the settlement server 102 sends the secret number via the settop box 200 and the remote control 202 to the IC card.

Also in this case, it is possible that the cryptograph unit 620 of the settop box 200 encrypts the secret number.

The settop box 200 may conduct the settlement without encrypting the secret number. In this situation, it is not necessarily required to arrange the cryptograph unit 620 in the settop box 200.

Moreover, in the first embodiment, the portable terminal 203 may integrally include the IC card for the settlement transaction as shown in FIG. 4. The portable terminal 203 includes the IC card communication processing program 607 to conduct communication processing with the IC card also in this case as shown in FIG. 4. The settlement transaction in this configuration is similar to that of the remote control 202 shows as an example in FIG. 16. In this case, the processing conducted by the remote control 202 is similarly conducted by the portable terminal 203.

In the settlement procedure, if it is required for the user to input a secret number in response to a request from the settlement program 704 of the settlement server 102, the user inputs a secret number from the key-in unit 601*c* shown in FIG. 4. In this case, if the settlement is conducted through online processing, the settlement server 102 sends the secret number to the settlement transaction server 300*a* or 300*b*. If the settlement is conducted through offline processing, the settlement server 102 sends the secret number via the settop box 200 and the remote control 203 to the IC card.

Also in this case, it is possible that the cryptograph unit 620 of the settop box 200 encrypts the secret number.

The settop box 200 may conduct the settlement without encrypting the secret number. In this situation, it is not necessarily required to arrange the cryptograph unit 620 in the settop box 200.

Next, description will be given of a second embodiment.

Figure 17:
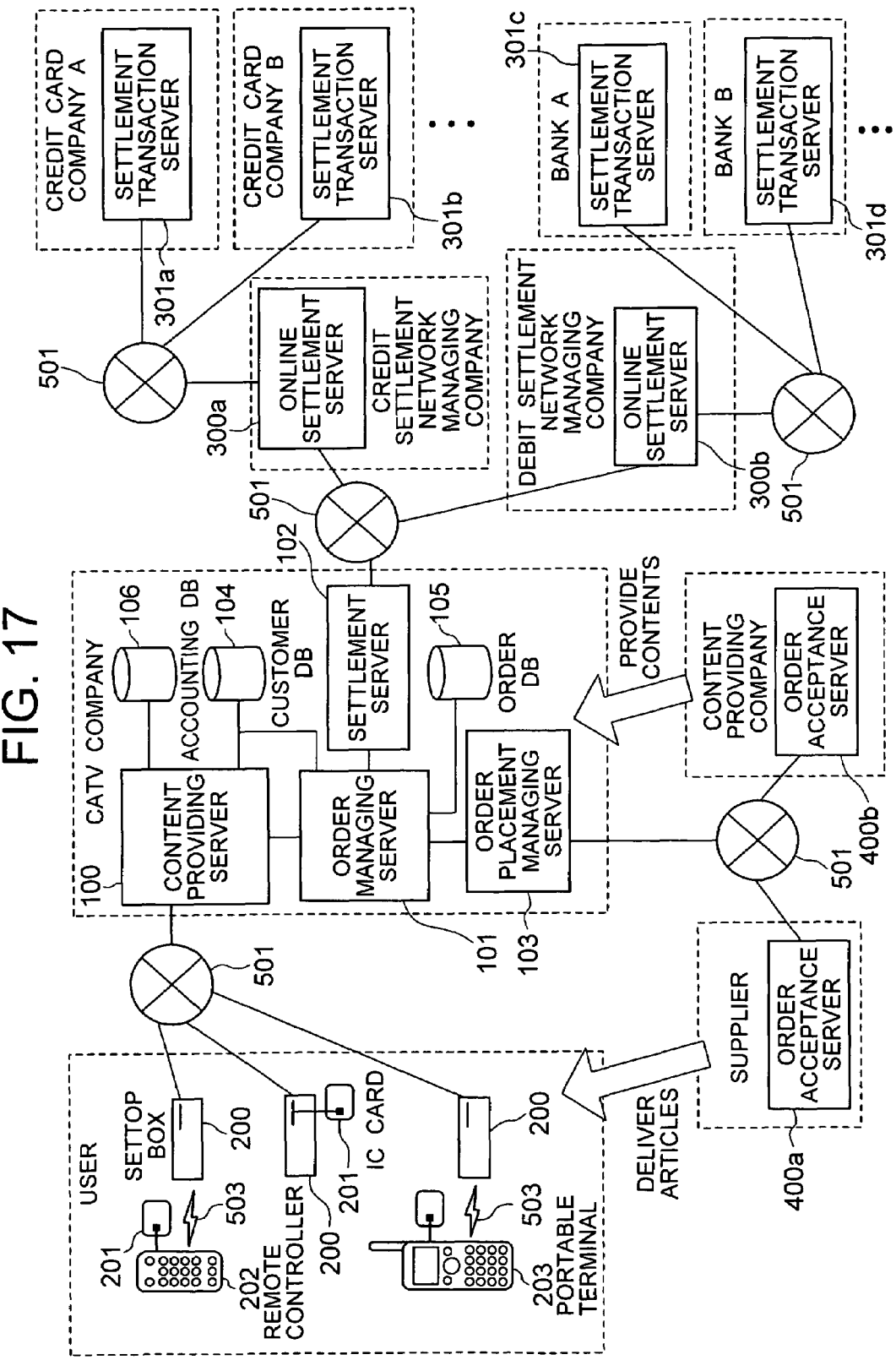
FIG. 17 is a diagram showing an overall configuration of a second embodiment of a settlement transaction system using a digital broadcast according to the present invention.

FIG. 17 shows an overall configuration of a second embodiment of a settlement transaction system using a digital broadcast according to the present invention.

In this configuration for bidirectional communication, data can be communicated between the settop box 200 and the content providing server 100 via a dedicated cable.

To conduct the conventional accounting operation, the content providing server 100 includes an accounting database 106.

In FIG. 17, the same constituent components as those of FIG. 1 are assigned with the same reference numerals and description thereof will be avoided.

Figure 18:
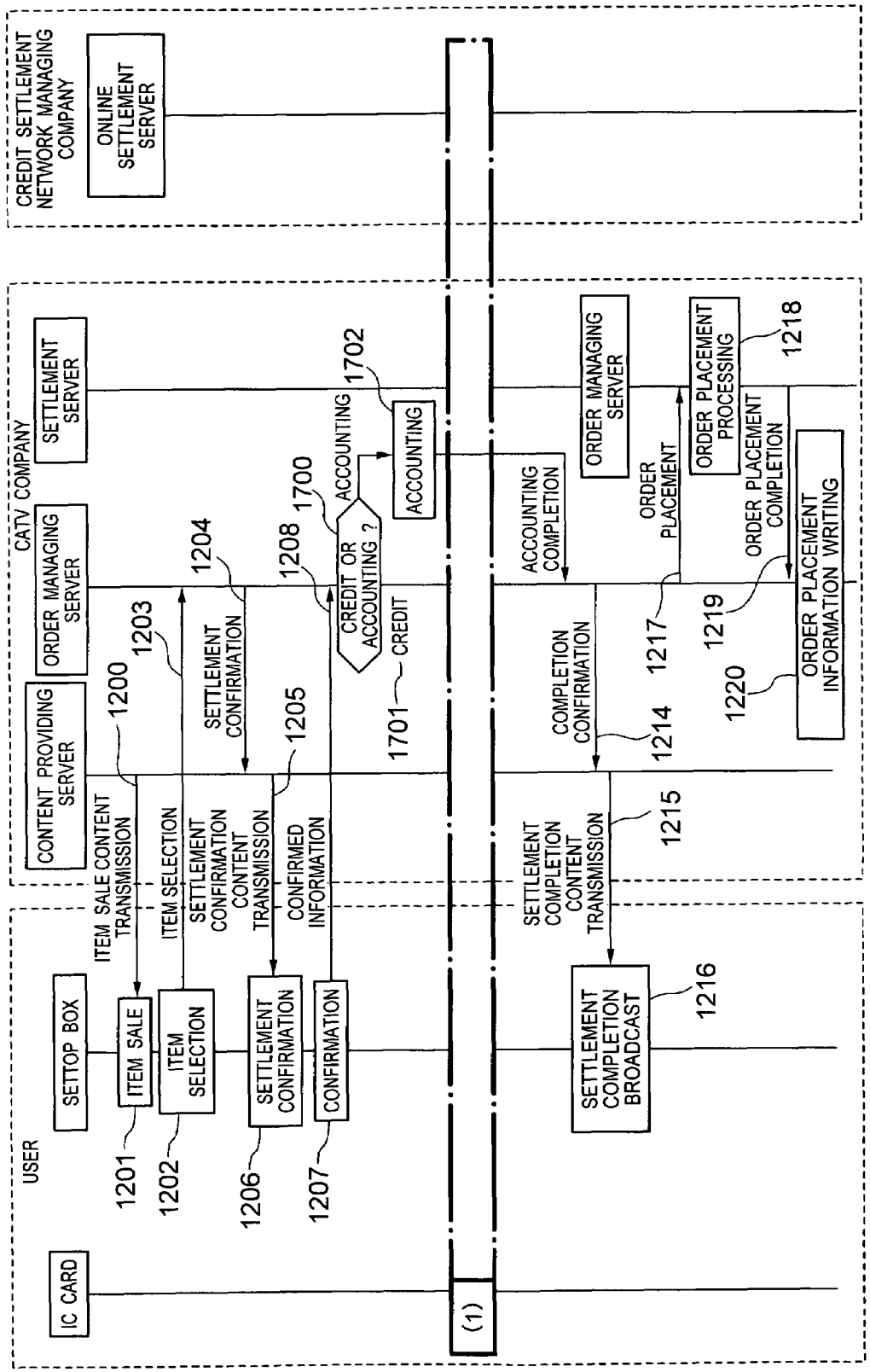
FIG. 18 is a flowchart showing a processing flow in which the order managing server 100 executes settlement transaction in consideration of the conventional accounting operation when a user selects a desired article using the settop box 200 from a TV shopping program of a digital broadcast.

FIG. 18 shows in a flowchart a processing flow in which the system of the embodiment conducts settlement transaction in consideration of the conventional accounting operation when a user selects a desired article using the settop box 200 from a TV shopping program of a digital broadcast.

The procedure from step S1200 to S1208 is substantially the same as that shown in FIG. 11.

However, in the text layouts shown in FIG. 9, the settlement type 905 as information data of each text includes data indicating an accounting settlement depending on cases according to the second embodiment of the present invention.

For example, when the user selects the accounting settlement as the settlement scheme, the settlement type 905 includes data indicating the accounting settlement.

In step S1700, the order managing server 101 makes a check for the settlement type 905 in the confirmed information text 1005 received via the content providing server 100 from the settop box 200. If the settlement type 905 is "credit", the system executes processing according to the flow shown in FIG. 12 and control goes to step S1214.

If the settlement type 905 is "accounting settlement", the order managing server 101 executes predetermined accounting processing 1702. The server 101 stores the transaction number 900, the item number 901, the unit price 902, the quantity 903, the settlement amount 904, the settlement type, and the monthly total amount 906 in the accounting database 106 with a correspondence established between these items and the customer identifier 800 associated therewith.

When the accounting processing 1702 is completely finished, control goes to step S1214.

The processing procedure from step S1214 to step S1220 is substantially the same as that shown in FIG. 11.

Next, description will be given of a third embodiment.

Figure 19:
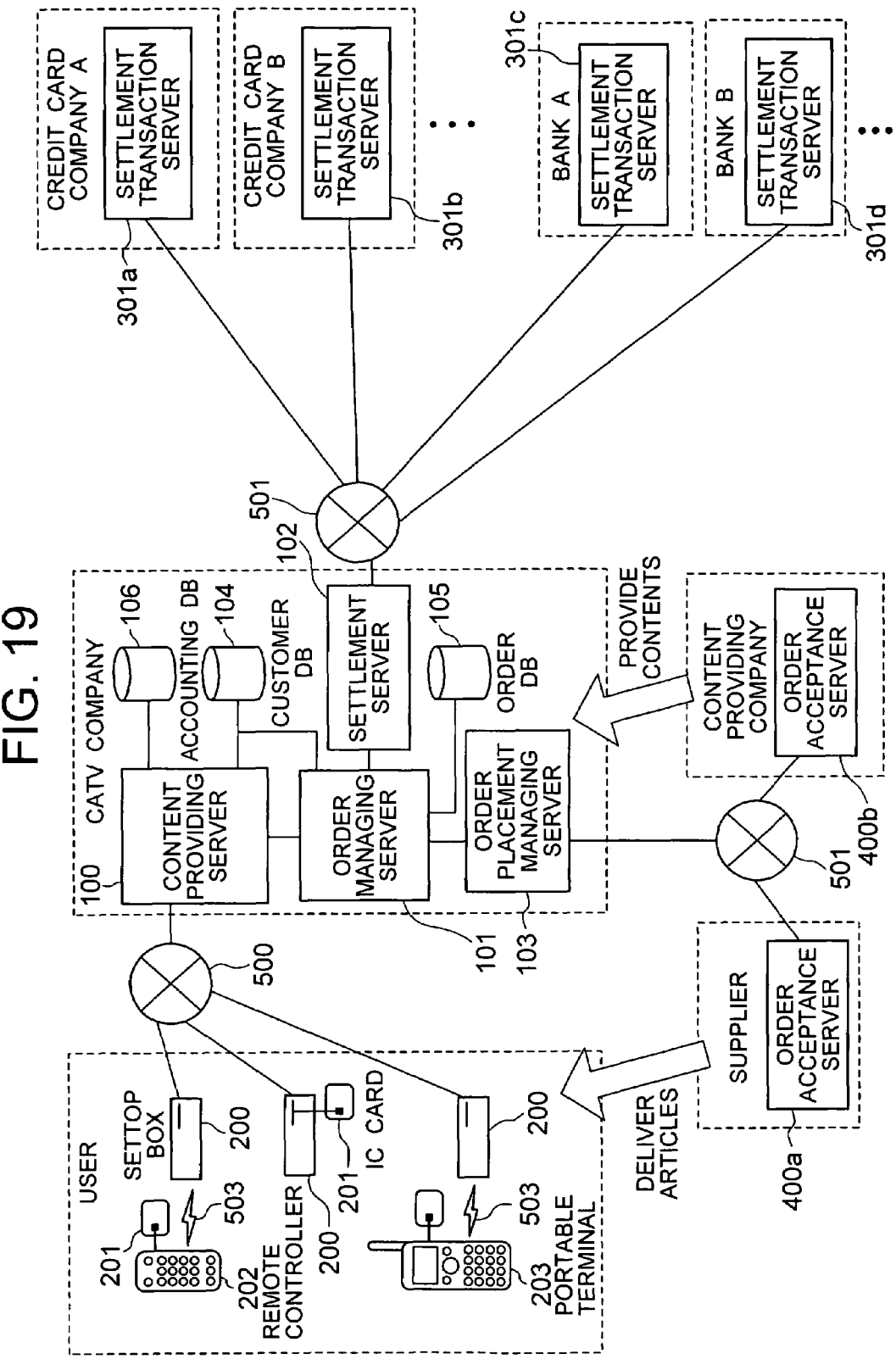
FIG. 19 is a diagram showing an overall configuration of a third embodiment of a settlement transaction system using a digital broadcast according to the present invention.

FIG. 19 shows an overall configuration of the third embodiment of a settlement transaction system using a digital broadcast according to the present invention.

In the configurations of FIGS. 1 and 17, the settlement network managing company manages and operates the online settlement servers 300a and 300b for each conventional settlement scheme. The settlement server 101 is connected via a network to these servers 300a and 300b. However, the settlement server 102 of the third embodiment includes predetermined settlement functions of the online settlement servers 300a and 300b under control of the settlement network managing company.

In the embodiments of FIGS. 1 and 17, the settlement server 102 connected respectively via the online settlement servers 300a and 300b using a network to the settlement transaction servers 301a and 301b managed by credit card companies A and B and to the settlement transaction servers 301c and 301d managed by banks A and B and 17, the settlement server 102. In the configuration of FIG. 19, the settlement server 102 can be directly connected via a network to the online settlement servers 300a and 300b and the settlement transaction servers 301c and 301d.

In FIG. 19, the same constituent components as those of FIGS. 1 and 17 are assigned with the same reference numerals and description thereof will be avoided.

Figure 20:
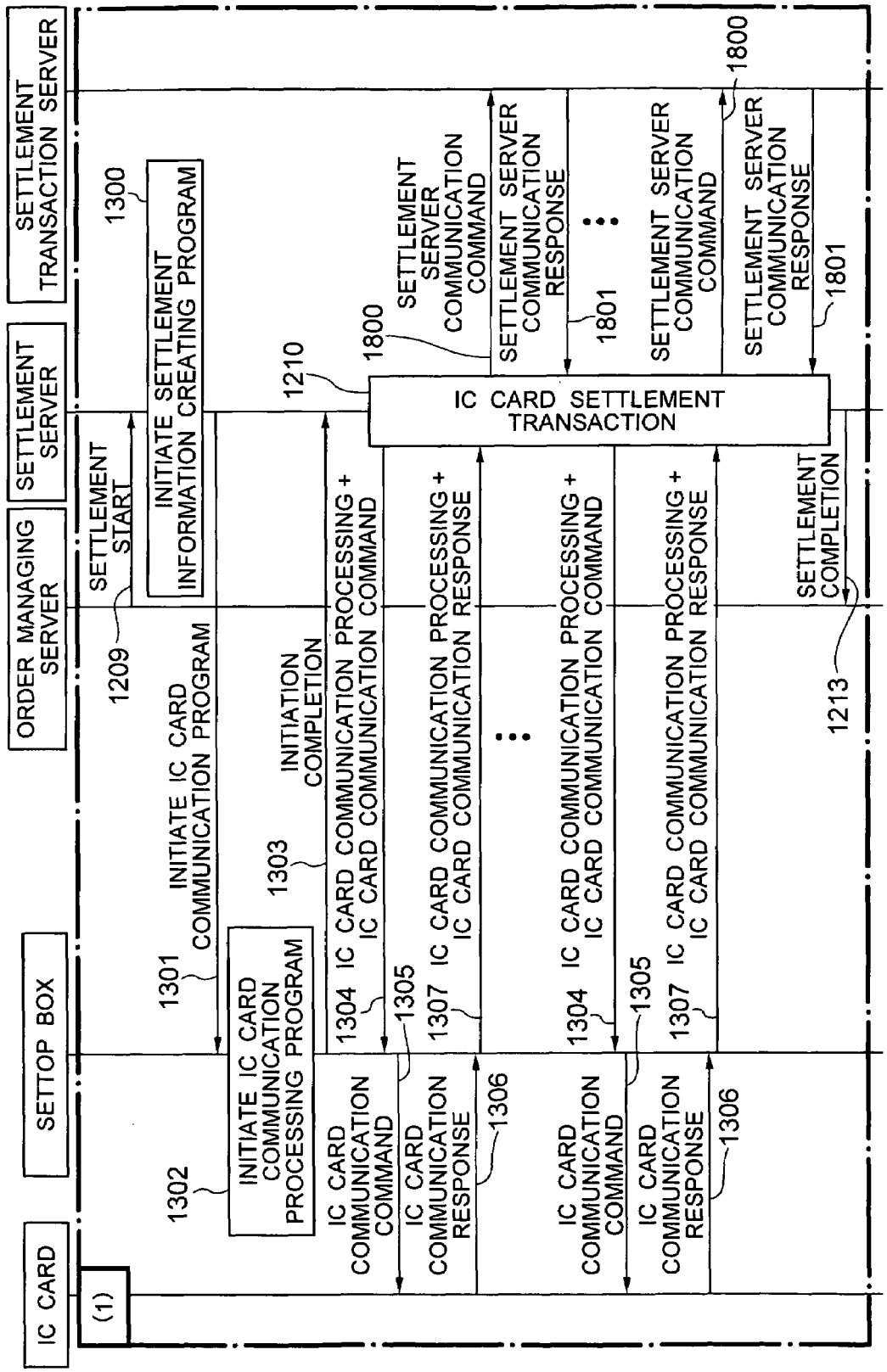
FIG. 20 is a flowchart showing a flow of settlement transaction executed by the settlement server 102 in the embodiment of the system when the server 102 has a function to appropriately establish connection to a settlement server of a financial institute of the online settlement servers 300a and 300b.

FIG. 20 shows a flowchart of settlement transaction executed by the settlement server 102 in the embodiment of the system when the server 102 has functions of the online settlement servers 300a and 300b in the embodiments of FIGS. 1 and 17 to select a connecting destination from a plurality of settlement transaction servers 301a to 301d according to a settlement associated company.

In FIG. 20, the same constituent components as those of FIG. 12 are assigned with the same reference numerals and description thereof will be avoided.

In the following description as in the description of the first embodiment, the settlement transaction is executed according to the standard of Europay, Mastercard, and Visa (EMV).

The processing procedure in step S1209 and steps S1300 to S1307 is substantially same as that shown in FIG. 12.

In step S1210, the settlement server 102 determines a settlement transaction server of a financial institute as the connecting destination according to a type of the settlement associated company.

In steps S1800 and S1801, the settlement server 102 repeatedly communicates with the settlement transaction server via the network using predetermined text items of EMV according to a predetermined processing procedure of EMV.

The predetermined processing procedure of EMV conforms to, for example, the IC credit standard "EMV2000 Integrated Circuit Card Specification for Payment Systems" or "EMV'96 Integrated Circuit Card Specification for Payment Systems". The settlement transaction of the settlement server includes processing and judgement to be conducted by the application protocol data unit (APDU) associated with the specification.

In the second and third embodiments as in the first embodiment, the settop box 200 may integrally include, in the overall system configuration of the settlement transaction system using a digital broadcast, the IC card 201 for settlement as shown in FIG. 2. Or, the remote control 202 may integrally include the IC card 201 for settlement as shown in FIG. 3. Alternatively, the portable terminal 203 may include the IC card 201 for settlement as shown in FIG. 4.

In the description of the first to third embodiments, the settlement types include "credit settlement" and "accounting settlement". However, if the user desires the settlement of a small amount of money, the electronic money settlement may be used in the settlement transaction.

Figure 21:
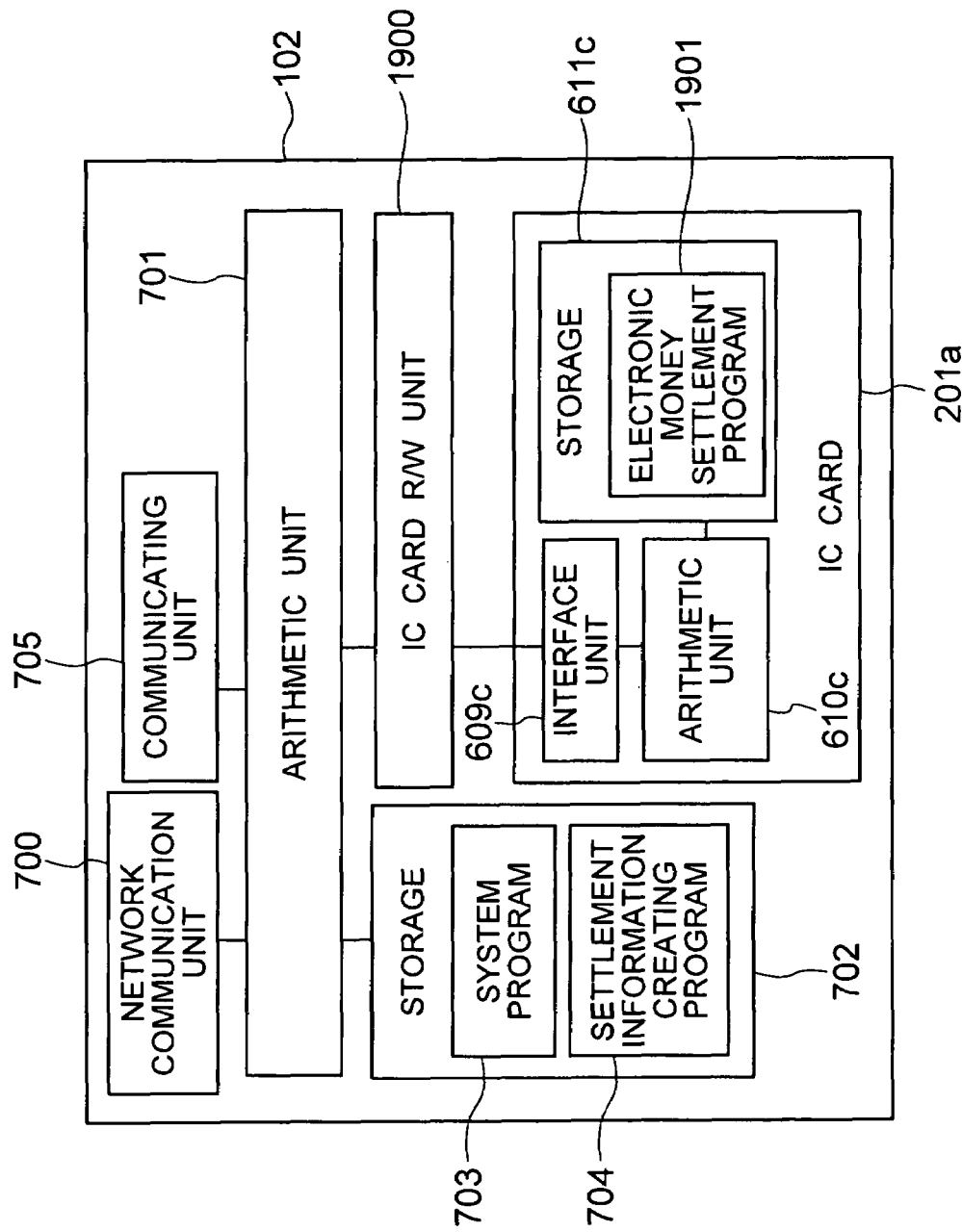
FIG. 21 is a diagram showing an internal configuration of the settlement server 102 using electronic money settlement.
Figure 22:
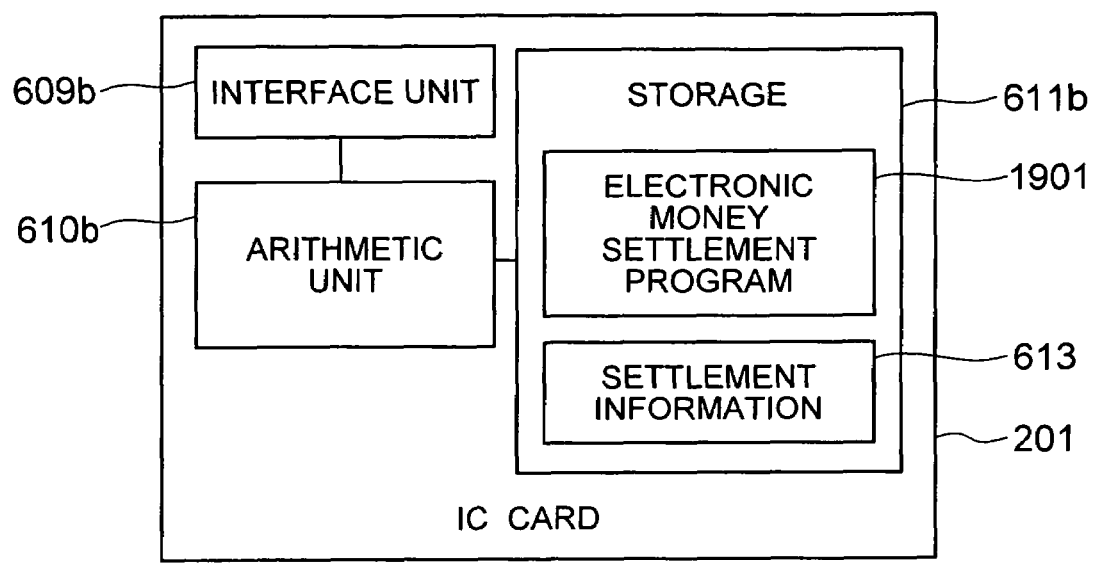
FIG. 22 is a diagram showing an internal configuration of the IC card 201 when the settlement is conducted using electronic money.

In this case, the settlement server 102 has an internal configuration shown in FIG. 21 and the IC card 201 has an internal configuration shown in FIG. 22.

In FIG. 21, a storage 611c includes an electronic money settlement program 1901. In the configuration of FIG. 21, the same constituent components as those of FIG. 5 are assigned with the same reference numerals and description thereof will be avoided.

In FIG. 22, a storage 611b includes an electronic money settlement program 1901. In the configuration of FIG. 22, the same constituent components as those of the internal configurations shown in FIGS. 2 to 4 are assigned with the same reference numerals and description thereof will be avoided.

The electronic money settlement transaction uses the processing procedure of steps S1304 to S1307 of the IC card 201, the settop box 200, and the settlement sever 102 shown in FIG. 12. That is, using the procedure, the electronic money program 1901 of FIG. 21 communicates with the IC card 201 and the IC card 201a in the settlement server 102 according to a predetermined electronic money settlement procedure to resultantly execute the electronic money settlement transaction.

It is also possible to remove the steps S1308 and S1309 from the procedure of the electronic money settlement transaction.

In conjunction with the embodiments 1 to 3, description has been given of the settlement scheme and procedure when the user purchases articles. Next, description will be given of settlement cancellation processing.

In the description, FIG. 1 showing the first embodiment will be used as an entire configuration of a settlement transaction system using a digital broadcast. The settlement transaction is executed according to the standard of Europay, Mastercard, and Visa (EMV) for easy understanding of the settlement.

FIGS. 23A to 23H show specific examples of layouts of texts communicated between the order managing server 101 and the settop box 200, between the order managing server 101 and the content providing server 100, and between the order managing server 101 and the settlement server 102.

As can be seen from FIGS. 23A to 23H, the texts include an item cancellation text 2000, an item information text 2003, a cancellation selection text 2005, a cancellation confirmation text 2007, a cancellation information text 2009, a cancellation start text 2011, a cancellation completion text 2013, and a cancellation completion confirmation text 2015. Each text includes a text identifier code or includes a text identifier code and information data.

The item cancellation text 2000 of FIG. 23A is a text sent from the settop box 200 via the communication network 501 to the order managing server 101 to notify that the user desires to cancel a purchase request. The text includes a text identifier code 2001 indicating that the text is an item cancellation text and a terminal identifier 1002, and a customer identifier 800.

The item information text 2003 of FIG. 23B is a text sent from the order managing server 101 to the content providing server 100 to notify overall settlement information of articles purchased by the user. The text includes a text identifier code 2004 indicating that the text is an item information text, a terminal identifier 1002, a customer identifier 800, a transaction number 900, and settlement information 2002. The information 2002 includes data items such as an item number 901, a unit price 902, a quantity 903, a settlement amount 904 indicating the total amount of articles to be purchased, and a settlement type 905 desired by the user. The item information text 2003 further includes a transaction number 900 for the overall settlement information of the user and settlement information 2002.

The cancellation selection text 2005 of FIG. 23C is a text sent from the settop box 200 via the communication network 501 to the order managing server 101 to notify settlement information of articles of which a purchase request is to be cancelled by the user. The text includes a text identifier code 2006 indicating that the text is a cancellation selection text, a terminal identifier 1002, a customer identifier 800, a transaction number 900, and a settlement amount 904.

The cancellation confirmation text 2007 of FIG. 23D is a text sent from the order managing server 101 to the content providing server 100 to notify settlement information of articles of which a purchase request is to be cancelled by the user. The text includes a text identifier code 2008 indicating that the text is a cancellation confirmation text, a terminal identifier 1002, a customer identifier 800, a transaction number 900, and a settlement amount 904.

The cancellation information text 2009 of FIG. 23E is a text sent from the settop box 200 via the communication network 501 to the order managing server 101 to notify settlement information of articles of which the cancellation of a purchase request is confirmed by the user. The text includes a text identifier code 2010 indicating that the text is a cancellation information text, a terminal identifier 1002, a customer identifier 800, a transaction number 900, and a settlement amount 904.

The cancellation start text 2011 of FIG. 23F is a text sent from the order managing server 101 to the settlement server 102 to notify a start of cancellation of a purchase request confirmed by the user. The text includes a text identifier code 2012 indicating that the text is a cancellation start text, a terminal identifier 1002, a customer identifier 800, a transaction number 900, and a settlement amount 904.

The cancellation completion text 2013 of FIG. 23G is a text sent from the settlement server 102 to the order managing server 101 to notify completion of the cancellation processing. The text includes a text identifier code 2014 indicating that the text is a cancellation completion text and a terminal identifier 1002.

The cancellation completion confirmation text 2015 of FIG. 23H is a text sent from the order managing server 101 to the content providing server 100 to notify completion of the cancellation processing. The text includes a text identifier code 2016 indicating that the text is a cancellation completion confirmation text and a terminal identifier 1002, a customer identifier 800, a transaction number 900, and a settlement amount 904.

It is not necessarily required for each of the cancellation selection text 2005, the cancellation confirmation text 2007, the cancellation information text 2009, the cancellation start text 2011, and the cancellation completion confirmation text 2015 to include all of the terminal identifier 1002, the customer identifier 800, the transaction number 900, and the settlement amount 904. It is also possible that the text includes the terminal identifier 1002 or the customer identifier 800 and the transaction number 900. Or, the text includes only the transaction number 900.

Figure 24A:
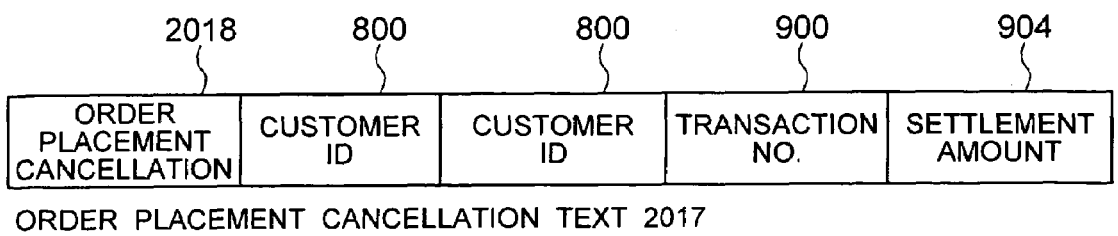
FIGS. 24A to 24C are diagrams showing specific examples of layouts of texts communicated between the settlement server 102 and the online settlement servers 300a and 300b or settlement transaction servers 301a to 301d under control of financial institutes and between the order managing server 101 and an order placement managing server 103.
Figure 24B:
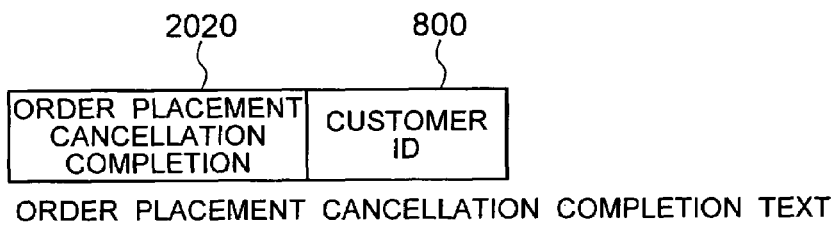
Figure 24C:
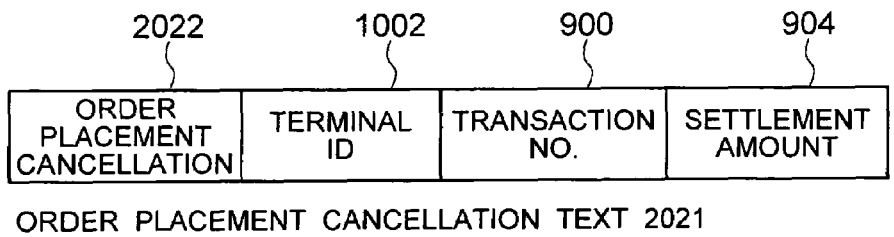

FIGS. 24A to 24C show specific examples of layouts of texts communicated between the settlement server 102 and the online settlement servers 300a and 300b or settlement transaction servers 301a to 301d under control of financial institutes and between the order managing server 101 and an order placement managing server 103.

As can be seen from FIGS. 24A to 24C, the texts include an order placement cancellation text 2017, an order placement cancellation completion text 2019, and an order cancellation text 2021. Each text includes a text identifier code and information data.

The order placement cancellation text 2017 of FIG. 24A is a text sent, after the cancellation processing is finished, from the order managing server 101 to the order placement managing server 103 to notify a start of cancellation processing of ordered articles. The text 2017 includes a text identifier code 2018 indicating that the text is an order placement cancellation text, a terminal identifier 1002, a customer identifier 800, a transaction number 900, and a settlement amount 904.

The order placement cancellation completion text 2019 shown in FIG. 24B is a text sent from the order placement managing server 103 to the order managing server 101 to notify completion of cancellation processing of ordered articles. The text 2019 includes a text identifier code 2020 indicating that the text is an order placement cancellation completion text and a customer identifier 800.

The order cancellation text 2021 of FIG. 24C is a text sent from the settlement server 102 to the online settlement servers 300a and 300b or the settlement transaction servers 301a to 301d under control of financial institutes to cancel the settlement transaction. The text 2021 includes a text identifier code 2022 indicating that the text is an order cancellation text, a terminal identifier 1002, a customer identifier 800, a transaction number 900, and a settlement amount 904.

Figure 25:
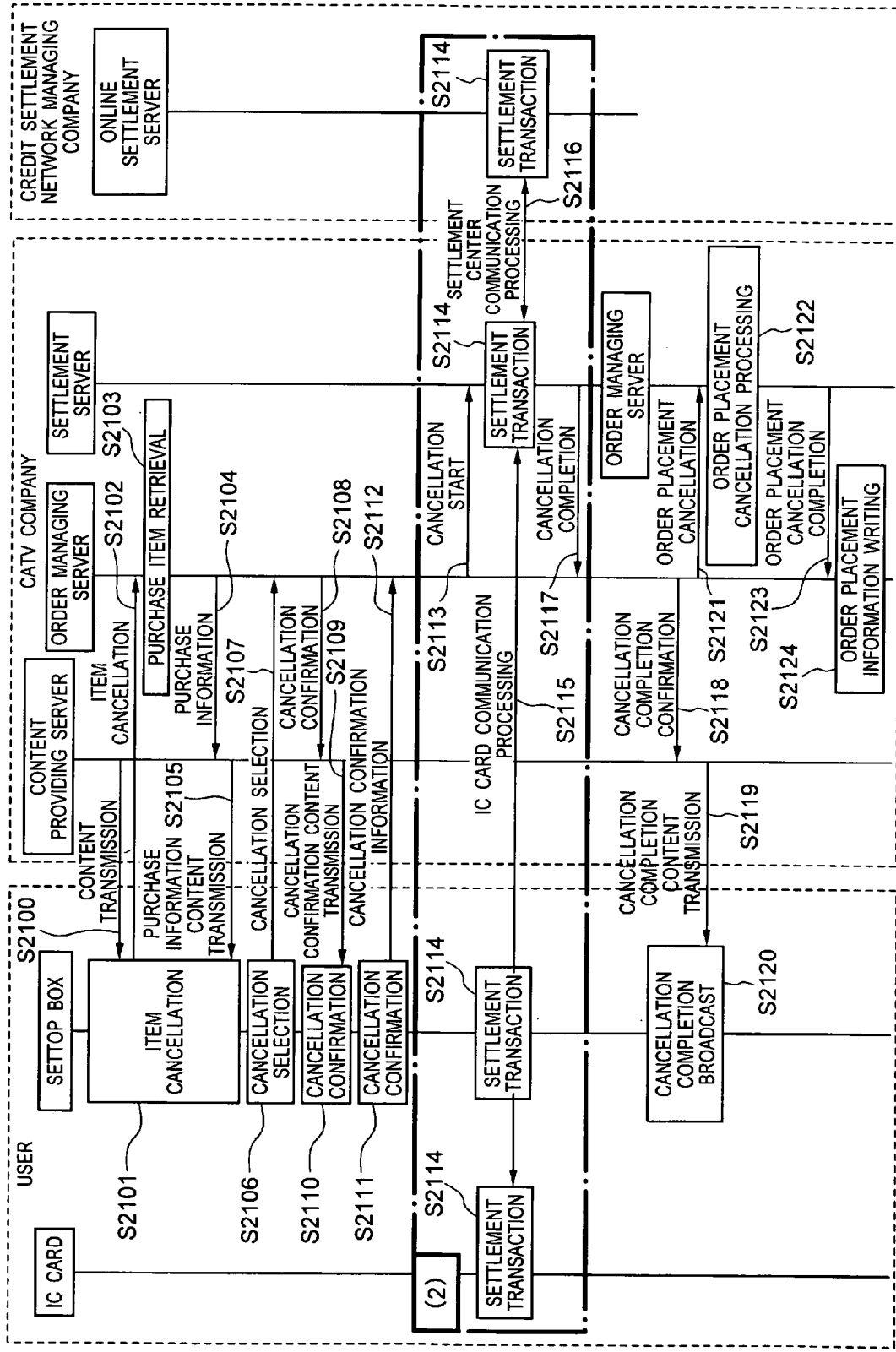
FIG. 25 is a flowchart showing a processing flow of the embodiment of the system to execute settlement cancellation processing when the user having selected a desired article using the settop box 200 from a TV shopping program of a digital broadcast desires to cancel the purchase of the article using the settop box 200.

Referring next to FIG. 25, description will be given of the settlement cancellation transaction.

FIG. 25 shows in a flowchart a processing flow of the order managing server 100 to execute the settlement cancellation processing in which after the user selects a desired article for purchase using the settop box 200 from a TV shopping program of a digital broadcast, the user requests cancellation of the purchase of the article using the settop box 200.

There also exists a case in which the user stops the settlement cancellation processing after selecting articles using the settop box 200 to cancel the purchase of the articles. Therefore, the processing flow of FIG. 25 can be terminated at any intermediate step in the flow. However, this termination is not shown in the drawings and will not be described.

In step S2100, the content providing server 100 sends a content via a dedicated cable to the settop box 200 of each user according to a predetermined broadcasting method.

In step S2101, a content for the user to cancel the purchase is displayed on a predetermined display such as a TV screen. This example uses a TV screen as the predetermined display.

In step S2101, the user selects cancellation of a purchased article from the content using the key-in unit 601*a* of the settop box 200.

In step S2102, the settop box 200 creates an item cancellation text 2000 and sends the text from the data communication unit 614 to the order managing server 101.

In step S2102, the server 101 receives the text 200 from the settop box 200 and proceeds to step S2103.

In step S2103, the server 101 makes a search through the order placement database 105 for all transaction information items using the customer identifier 800 of the text 200. If all transaction information items are detected, control goes to step S2104.

In step S2104, the order managing server 101 creates an item information text 2003 by adding the transaction information as settlement information 2003 and sends the text 2003 to the content providing server 100. In step S2104, when the server 100 receives the text 2003, the process goes to step S2105.

In step S2105, the server 100 sends to the settop box 200 predetermined content information to display a purchase information screen shown in FIG. 26.

In step S2105, when the settop box 200 receives the predetermined content information from the server 100, control goes to step S2106.

In step S2106, the settop box 200 receives the content and displays the purchase information screen of FIG. 26 on the TV screen.

In step S2106, the user visually checks the purchase information screen and selects an article to be purchased. When detailed information of the selected item is correct, the user selects "O.K." and then control goes to step S2107.

In step S2107, the settop box 200 generates a cancellation selection text 2005 and sends the text from the data communication unit 614 to the order managing server 101.

In step S2107, when the server 101 receives the text 2005 from the settop box 200, the process goes to step S2108.

In step S2108, the server 101 creates a cancellation confirmation text 2007 and sends the text from the network communication unit 700 to the content providing server 100. Information of the text 2007 is similar to that of the cancellation selection text 2005.

In step S2108, the server 100 receives the text 2007 from the order managing server 101 and control goes to step S2109.

In step S2109, the server 100 transmits to the settop box 200 predetermined content information to display a cancellation confirmation screen shown in FIG. 27.

In step S2109, when the settop box 200 receives the predetermined content information from the server 100, control goes to step S2110.

In step S2110, the settop box 200 displays the cancellation confirmation screen of FIG. 27 on the TV screen using the content from the settop box 200.

In step S2110, the user visually checks the screen and confirms detailed information of the item for settlement cancellation. If the detailed information is correct, the user selects "O.K." from the screen using the key-in unit 601*a* of the settop box 200 and the process goes to step S2111.

In step S2111, the settop box 200 creates a cancellation information text 2009 and sends the text from the data communication unit 614 to the order managing server 101.

In step S2111, the server 101 receives the text 2009 from the settop box 200 and control goes to cancellation processing. The processing corresponds to the settlement transaction in the frame (1) of dot-and-dash lines shown in FIG. 11. In the following description, the settlement transaction of FIG. 11 is used in place of the cancellation processing for easy understanding of the processing.

The procedure of the cancellation processing is started when the server 101 sends a cancellation start text 2011 to the settlement server 102. Thereafter, the cancellation processing S2114 is executed by the IC card 201, the settop box 200, the settlement server 102, and the online settlement server 300*a*. The cancellation processing is executed according to a predetermined cancellation processing procedure associated with the settlement type specified at purchase of the item.

After the cancellation processing S2114 is finished, when the order managing server 101 receives a cancellation completion text 2013 from the settlement server 102, the cancellation processing is finished. Thereafter, control goes to step S2118.

In step S2118, the server 101 creates a cancellation completion confirmation text 2013 and sends the text from the network communication unit 700 to the content providing server 100.

In step S2118, the server 100 receives the text 2013 from the order managing server 101 and control proceeds to step S2119.

Figure 28:
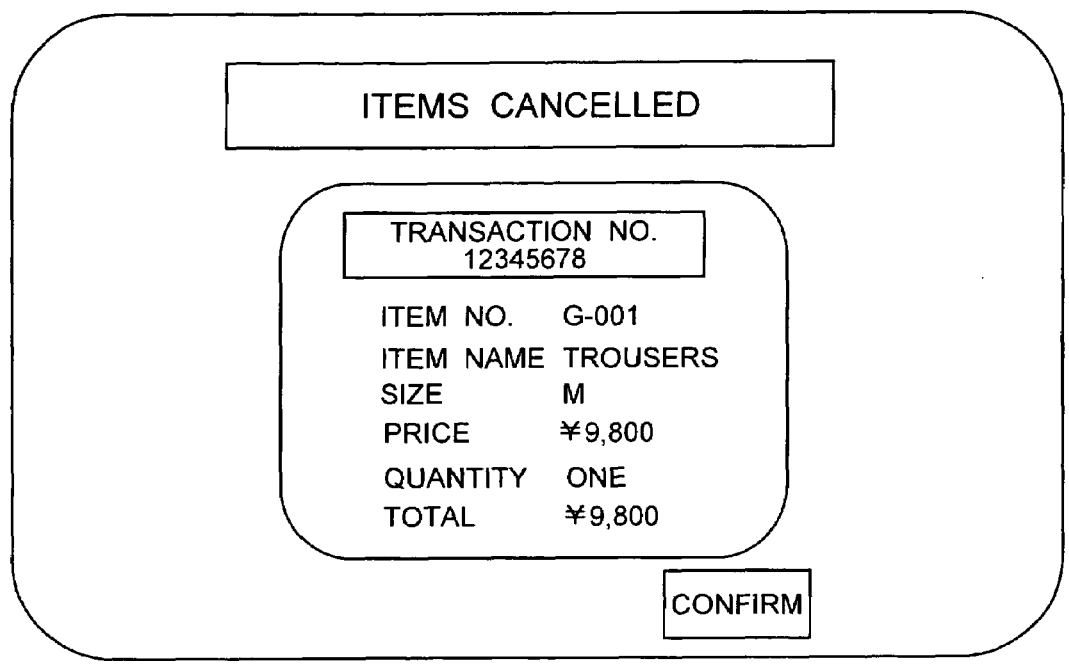
FIG. 28 is a diagram showing a specific example of a cancellation completion screen image to notify completion of the purchase cancellation to the user.

In step S2119, the server 100 sends to the settop box 200 predetermined content information to display a purchase cancellation completion screen shown in FIG. 28.

In step S2119, when the settop box 200 receives the predetermined content information from the server 100, the process goes to step S2120.

In step S2120, the settop box 200 receives the content and displays the purchase cancellation completion screen on the TV screen, and then control goes to step S2121.

In step S2121, the order managing server 101 creates an order placement cancellation text 2017 and sends the text from the network communication unit 700 to the order placement managing server 103.

In step S2121, the server 103 receives the text 2017 from the order managing server 101 and control goes to step S2122.

In step S2122, the server 103 executes via the network communication unit 700 predetermined order placement cancellation processing for the order acceptance server 400a under control of the supplier of articles to be purchased by the user.

Alternatively, the order placement cancellation may be conducted as follows. The order placement managing server 103 executes via the network communication unit 700 predetermined order placement cancellation processing for the order acceptance server 400b under control of the content providing company creating and providing contents of TV shopping. Thereafter, the content providing company executes predetermined order placement cancellation processing for the order acceptance server 400a under control of the supplier of articles to be purchased by the user.

In step S2122, when the order placement managing server 103 finishes the order placement cancellation processing, control goes to step S2123.

In step S2123, the server 103 creates an order placement cancellation completion text 2019 and sends the text from the network communication unit 700 to the order managing server 101.

In step S2123, the server 101 receives the text 2019 from the order placement managing server 103 and control proceeds to step S2124.

In step S2124, the server 101 deletes the order placement information items for which the order placement cancellation processing is finished. That is, the server 101 deletes the transaction number 900, the item number 901, the unit price 902, the quantity 903, the settlement amount 904, the settlement type 905, and the monthly total amount 906 from the order placement list corresponding to the customer identifier 800.

The cancellation processing described above conforms to, for example, the IC credit standard "EMV2000 Integrated Circuit Card Specification for Payment Systems" or "EMV'96 Integrated Circuit Card Specification for Payment Systems". The settlement transaction of the settlement server includes processing and judgement to be conducted by the application protocol data unit (APDU) associated with the specification.

In the description of the settlement cancellation processing as in that of the first embodiment, the settop box 200 may integrally include, in the overall system configuration of the settlement transaction system using a digital broadcast, the IC card 201 for settlement as shown in FIG. 2. Or, the remote control 202 may integrally include the IC card 201 for settlement as shown in FIG. 3. Alternatively, the portable terminal 203 may include the IC card 201 for settlement as shown in FIG. 4.

In the first to third embodiments, the settop box 200 receives, in step S1201 of FIG. 11, the content from the content providing server 100 and displays the content of items on a predetermined display such as a TV screen. However, it is also possible that the settop box 200 communicates with the IC card 201 including the storage 611a storing the personal information 612 to acquire the personal information 612. The settop box 200 then obtains age data from the information 612 and selects, using the age data, a content of items according to an age group of the user to resultantly display the content on a predetermined display such as a TV screen. It is also possible that the settop box 200 obtains address data from the information 612 and selects, using the address data, a content of items according to a district of the address of the user to resultantly display the content on a predetermined display such as a TV screen.

Data other than the age data and the address data may also be used. For example, according to the personal information 612 in the storage 611a of the IC card 201, the settop box 200 may examine detailed items of the content sent from the content providing server 100 to appropriately display the detailed items on a predetermined display such as a TV screen.

When a limited number of items are offered for sale, it is possible that the order managing server 101 integrally includes a clock module to obtain, at start of settlement transaction, a date and/or time for each user desiring a purchase. According to information items of the data and/or the time, the server 101 determines the user to purchase the items. For example, the server 101 determines the user who can purchase desired items in an ascending order of the time value. That is, the user having an earlier time can purchase the items. For a user conducting the settlement during a time zone specified by a broadcasting company such as a content providing company or a CATV company, it may also possible to provide a particular service. For example, the value of points for the settlement is doubled for the user.

In the description of the first to third embodiments, the user selects a settlement type for purchased articles from the screen image of a predetermined display such as a TV screen. However, it is also possible that according to the settlement amount of articles purchased by the user, the settop box 200 automatically determines the settlement type and then requests the user to confirm the settlement type on the screen.

Additionally, when the item selection text 1000 and the confirmed information text 1005 are communicated between the settop box 200 and the order managing server 101 in the first to third embodiments, each text includes information data items such as an item number 901, a unit price 902, a quantity 903, and a settlement amount 904. However, it is also possible that the information data of each text includes only an item number 901. In this case, the order managing server 101 includes a database including item information such as an item number 901, a unit price 902, a quantity 903, and a settlement amount 904. If the item information is used, the server 101 makes a search for the item information using the item number 901 of each text.

When the settlement start text 1007 shown in FIG. 9 is used in the first to third embodiments, the text includes information data such as an item number 901, a unit price 902, a quantity 903, and a settlement amount 904. However, the text may include only a settlement amount 904.

The invention may be embodied in other specific forms without departing from the spirit or essential characteristics thereof. The present embodiment is therefore to be considered in all respects as illustrative and not restrictive, the scope of the invention being indicated by the appended claims rather than by forgoing description and range of equivalency of the claims are therefore intended to be embraced therein.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A settlement transaction system, comprising an IC card, a terminal, a settlement server, and a plurality of settlement transaction servers, wherein:
   the IC card includes a storage unit for storing card identifier information to be used in settlement;
   the terminal includes:
     a reading unit for reading the card identifier information from the storage unit; and a transmitting unit for transmitting to the settlement server amount information of items to be purchased using the card identifier information and the IC card; and the settlement server includes:

a receiving unit for receiving the card identifier information and the amount information;

a settlement information creating unit for creating settlement information, including information on a settlement entity which should perform a settlement transaction, according to the card identifier information and the amount information; and a settlement information communicating unit for issuing a settlement request to a settlement transaction server according to the settlement information; and each of the plurality of settlement transaction servers is provided for a respective one of a plurality of settlement entities, is arranged to perform a settlement transaction, and includes:

a settlement information communicating unit for receiving a settlement request; and a settlement transaction unit for executing settlement transaction according to the received settlement request.

2. A settlement transaction system according to claim 1, further comprising an order managing server, the terminal including:

an item ordering unit for issuing an order of items to the order managing server;

the transmitting unit transmitting to the order managing server the card identifier information and the amount information of items; and the order managing server including:

an order accepting unit for accepting the order of items;

the receiving unit for receiving the card identifier information and the amount information from the terminal; and the transmitting unit transmitting the card identifier information and the amount information to the settlement server.

3. A settlement transaction system according to claim 2, further comprising a content providing server, wherein:

the terminal includes:

the receiving unit receiving a content from the content providing server; and the item ordering unit for issuing an order of items to the order managing server according to the content;

the order managing server including a settlement indicating unit for sending settlement confirmation information of the order of items to the content providing server, transmitting the amount information to the content providing server, and thereby indicating a start of settlement;

the content providing server including the transmitting unit transmitting a settlement confirmation content to the terminal, the content being created according to an item order content and the settlement confirmation information; and the content providing server transmits the item order content to the terminal, the order managing server accepts an order from the terminal and transmits a settlement confirmation signal to the content providing server according to the order, the content providing server transmits to the terminal a settlement confirmation content created using the settlement confirmation signal, the terminal confirms, according to the settlement confirmation content, items ordered before and transmits to the order managing server confirmation information indicating the confirmation of the items ordered before, and order managing server transmits an indication of a start of settlement to the settlement server.

4. A settlement transaction system according to claim 1, wherein:

the terminal includes a module for executing functions required by level 1 of specifications of Europay, Mastercard, and Visa (EMV); and the settlement server includes a module for executing functions required by level 2 of specifications of EMV.

5. A settlement transaction system according to claim 1, wherein:

the reading unit of the terminal reads card identifier information required by level 1 of specifications of EMV; and the settlement information creating unit of the settlement server creates settlement information required by level 2 of specifications of EMV.

6. The settlement transaction system according to claim 1, wherein the respective settlement entity comprises either credit brand company capable of conducting credit card settlement or a bank capable of conducting debit card settlement or both.

7. An integrated-circuit (IC) card used for a settlement transaction system comprising a terminal including a reading unit for reading card identifier information and a transmitting unit for transmitting the card identifier information and amount information of articles, a settlement server including a receiving unit for receiving the card identifier information and the amount information from the terminal, a settlement unit for creating settlement information according to the card identifier information and the amount information, and a settlement information communicating unit for issuing a settlement request for a settlement entity according to the settlement information; and a plurality of settlement transaction servers of a plurality of settlement entities each settlement transaction server including a settlement information communicating unit for receiving a settlement request and a settlement transaction unit for executing settlement transaction according to the received settlement request, the IC card comprising a storage unit for storing the card identifier information.

8. A terminal used for a settlement transaction system comprising an IC card including a storage unit for storing card identifier information, a settlement server including a receiving unit for receiving the card identifier information and amount information of articles to be purchased using the IC card, a settlement unit for creating settlement information according to the card identifier information and the amount information, and a settlement information communicating unit for issuing a settlement request for a settlement entity according to the settlement information; and a plurality of settlement transaction servers of a plurality of settlement entities each settlement transaction server including a settlement information communicating unit for receiving a settlement request and a settlement transaction unit for executing the received settlement transaction according to settlement request, the terminal, comprising:

a reading unit for reading the card identifier information; and a transmitting unit for transmitting the card identifier information and the amount information to the settlement server.

9. A settlement transaction method using a settlement transaction system, which comprises an IC card, a terminal, a settlement server, and a plurality of settlement transaction servers of a plurality of settlement entities, wherein:

- the terminal reads card identifier information of the IC card from the IC card and transmits to the settlement server the card identifier information and amount information of items purchased using the IC card;
- the settlement server receives the card identifier information and the amount information, creates settlement information including information on one of the settlement entities which should perform a settlement transaction, according to the card identifier information and the amount information, and issues a settlement request to a settlement transaction server of the one settlement entity according to the settlement information; and
- the settlement transaction server of the one settlement entity receives the settlement request and executes settlement transaction according to the settlement request.

10. A settlement transaction method according to claim 9, wherein:

- the terminal executes functions required by level 1 of specifications of EMV; and
- the settlement server executes functions required by level 2 of specifications of EMV.

11. A settlement transaction method according to claim 9, wherein:

- the terminal reads card identifier information as required by level 1 of specifications of EMV; and
- the settlement server creates settlement information as required by level 2 of specifications of EMV.

12. The settlement transaction method according to claim 9, wherein the one settlement entity comprises either credit brand company capable of conducting credit card settlement or a bank capable of conducting debit card settlement or both.

* * * * *